US012348928B2

United States Patent
Cooper et al.

(10) Patent No.: US 12,348,928 B2
(45) Date of Patent: Jul. 1, 2025

(54) SUCTION CUP HEADPHONE APPARATUS

(71) Applicant: Amari Cooper, Allen, TX (US)

(72) Inventors: Amari Cooper, Allen, TX (US); James Ghiorse, Atlanta, GA (US); Lee Farris, Lilburn, GA (US); Aaron Pierce, Oviedo, FL (US)

(73) Assignee: Amari Cooper, Allen, TX (US)

( * ) Notice: Subject to any disclaimer, the term of this patent is extended or adjusted under 35 U.S.C. 154(b) by 283 days.

(21) Appl. No.: 18/112,474

(22) Filed: Feb. 21, 2023

(65) Prior Publication Data

US 2023/0269518 A1 Aug. 24, 2023

Related U.S. Application Data

(60) Provisional application No. 63/312,066, filed on Feb. 20, 2022.

(51) Int. Cl.
*H04R 25/00* (2006.01)
*H04R 1/10* (2006.01)
*H04R 5/033* (2006.01)

(52) U.S. Cl.
CPC ........... *H04R 1/105* (2013.01); *H04R 1/1008* (2013.01); *H04R 5/0335* (2013.01)

(58) Field of Classification Search
USPC ........................................................ 381/374
See application file for complete search history.

(56) References Cited

U.S. PATENT DOCUMENTS

| | | | |
|---|---|---|---|
| 4,791,673 | A | 12/1988 | Schreiber |
| 7,508,932 | B1 | 3/2009 | Bergh |
| 8,328,830 | B1 | 12/2012 | Pandit |
| 10,124,207 | B2 | 11/2018 | Artioli |
| 10,165,345 | B2 | 12/2018 | Slater |
| 11,575,984 | B2 | 2/2023 | Mou |

*Primary Examiner* — Phylesha Dabney
(74) *Attorney, Agent, or Firm* — The Law Office of Matthew Wilson, PLLC; Matthew Wilson

(57) ABSTRACT

A suction cup headphone apparatus capable of enclosing an ear of a user by way of suction and delivering audible sound. The apparatus comprises a suction cup, a loudspeaker unit, and a housing unit. The suction cup is mounted to the housing unit. The loudspeaker unit is mounted inside the suction cup. The apparatus is placed over the ear. The user applies repeated pressure to the distal end of the suction cup. This forces air out of the suction cup, creating a suction seal between the apparatus and the ear and/or head of the user. The suction seal can keep the apparatus on the user's ear without the necessity of a band until the user removes the apparatus.

18 Claims, 19 Drawing Sheets

SUCTION CUP HEADPHONE APPARATUS

CROSS-REFERENCE TO RELATED APPLICATIONS

This application claims the benefit and priority of U.S. Provisional Application 63/312,066, which was filed on Feb. 20, 2022, the entire disclosure of which is incorporated herein by reference.

BACKGROUND

1. Field

This disclosure relates generally to the field of loudspeakers, headphones, earphones, and earbuds.

2. Description of the Related Art

A user who desires to listen to a smartphone, a portable radio, a music player, or any other sound-producing electronic device without disturbing any other person—or without being disturbed—typically uses a set of headphones, a set of earphones, or a set of earbuds. These devices have various advantages and disadvantages.

A typical set of headphones comprises a left headphone and a right headphone, both of which are connected by way of a band. Each headphone has a cavity. The band is curved so that the cavities of each headphone face one other. A user pulls the headphones apart and places the band on the user's head so that the cavity of the left headphone faces the user's left ear while the cavity of the right headphone faces the user's right ear. After the band is placed on the user's head, the user releases the headphones, causing the band to bend toward its natural state. This causes the headphones to apply pressure on the user's ears. This pressure holds the set of headphones in place. However, the band may apply too much pressure, causing discomfort to the user's ears. This band may also ruffle the user's hair. The added weight of the band may also make exercise cumbersome.

A typical set of earphones comprises a left earphone and a right earphone, both of which are connected by way of a band, which is typically smaller and lighter than a headphone band. The earphone band is curved so that each earphone faces one other. A user pulls the earphones apart and places the band on the user's head so that the left earphone faces the user's left ear while the right earphone faces the user's right ear. After the band is placed on the user's head, the user releases the earphones, causing the band to bend toward its natural state. This, in turn, causes the earphones to apply pressure on the user's ears. This pressure holds the set of earphones in place. Although a typical set of earphones is lighter and smaller than a typical set of headphones, the earphone band nevertheless places pressure on the user's ears. Moreover, earphone bands may mess with the user's hair. Thus, like headphones, earphones are cumbersome.

A typical set of earbuds comprises two earbuds. A single earbud fits directly into a user's ear. A set of earbuds are connected by way of a cord, or wirelessly. Thus, there is no band to connect a typical set of earbuds. However, placing an earbud directly into the user's ear is invasive and conducive to the spread of infectious germs, especially when the set of earbuds is used by more than one person. Plus, an earbud can fall out during exercise, creating an inconvenience. Also, earbuds, being small, may be easy to misplace.

Thus a suction cup headphone apparatus, solving the aforementioned problems is desired.

SUMMARY

The present apparatus is capable of delivering audible sound to a user by enclosing an ear of the user by utilizing a suction seal. The apparatus comprises a suction cup, a loudspeaker unit, and a housing unit.

The suction cup comprises a suction container. The suction container has an elastic characteristic. The suction container is configured to surround a cavity. The suction container comprises a proximal end and a distal end. The distal end has a first state. The distal end is capable of being depressed. The distal end is configured to adopt a second state when the distal end is depressed. The distal end is configured to expel air from the cavity when the distal end adopts the second state. The distal end is capable of reverting to the first state. The distal end is capable of causing air pressure inside the cavity to fall when the distal end reverts to the first state. The proximal end comprises an annular suction lip. The annular suction lip is configured to encircle an ear of the user. The annular suction lip is configured to contact a head of the user when the annular suction lip encircles the ear. The suction container is configured to enclose the ear when the annular suction lip contacts the head. The suction cup is configured to create a suction seal around the ear when the distal end reverts to the first state while the suction container encloses the ear. The suction seal is capable of keeping the suction cup in place over the ear until the suction cup is removed.

The loudspeaker unit is placed inside the cavity. The loudspeaker unit is connected to the suction container. The loudspeaker unit comprises a loudspeaker unit casing and a set of internal components. The set of internal components is mounted inside the loudspeaker unit casing. The set of internal components comprises a loudspeaker, an integrated circuit, and a battery. The battery is connected to the loudspeaker. The battery is connected to the integrated circuit. The battery is configured to provide electrical power to the loudspeaker. The battery is configured to provide electrical power to the integrated circuit. The integrated circuit comprises a receiver. The receiver is configured to receive at least one external audio signal from at least one external source. The integrated circuit is connected to the loudspeaker. The integrated circuit is configured to amplify the at least one external audio signal. The integrated circuit is configured to deliver the at least one external audio signal to the loudspeaker. The loudspeaker is configured to convert the at least one external audio signal into the audible sound. The loudspeaker is configured to direct the audible sound toward the ear.

The housing unit is configured to receive the suction cup and the loudspeaker unit. The housing unit comprises a first housing unit. The first housing unit comprises a first annular sidewall, a first flange extending radially inwardly from the first annular sidewall, and a plurality of centering braces that extend radially inwardly from the first annular sidewall and perpendicularly from the first flange. The plurality of centering braces is configured to apply direct pressure to the suction container. The plurality of centering braces is configured to apply indirect pressure to the loudspeaker unit. The distal end of the suction cup is configured to protrude through the first flange.

A plurality of suction cup headphone apparatuses can be configured to communicate with each other to synchronize content delivery. An initial apparatus is configured to communicate with at least one receiving apparatus. The initial apparatus is configured to receive the at least one digital signal. The initial apparatus is configured to deliver the at least one digital signal to the at least one receiving apparatus. The initial apparatus is configured to receive at least one digital audio signal. The initial apparatus is configured to bifurcate the at least one digital audio signal into a left audio channel and a right audio channel. The initial apparatus is configured to deliver the left audio channel or the right audio channel to the at least one receiving apparatus. The at least one receiving apparatus is capable of converting the left audio channel or the right audio channel into audible sound.

These and other features of the apparatus will become readily apparent upon further review of the following specification.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Interpretive Considerations

Figure 1:
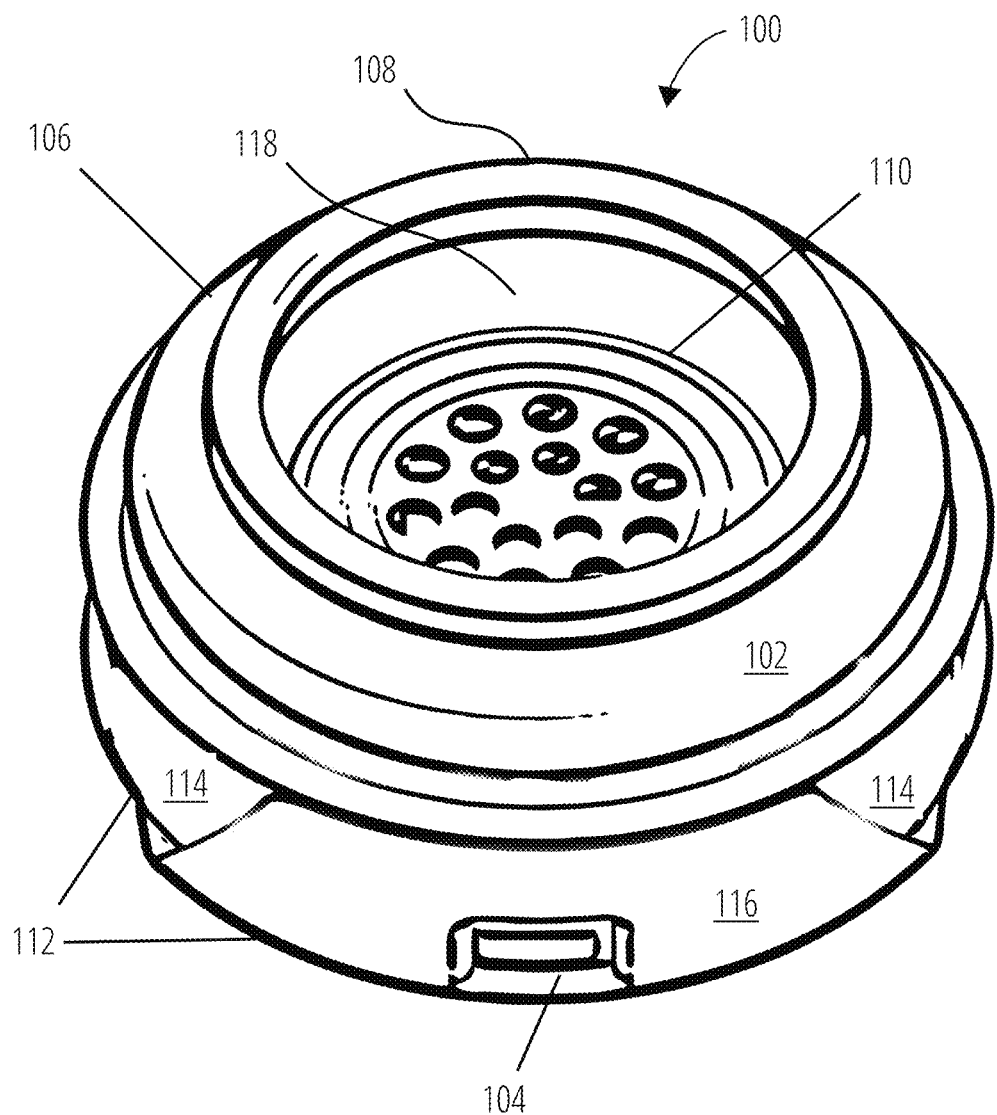
FIG. 1 is a perspective view of the suction cup headphone apparatus in accordance with one embodiment.

First, the following specification discloses what the applicant(s) believe(s) to be the best mode for using the apparatus at the time this patent application was filed. Since one of ordinary skill in the art may recognize from the following specification that substantially equivalent structures or substantially equivalent acts may be used to achieve the same results in exactly the same way, or to achieve the same results in a not dissimilar way, the following specification should not be interpreted as limiting the apparatus to one embodiment. Likewise, individual aspects (sometimes called species) of the apparatus are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way. Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the apparatus may arise. Such advances are hereby incorporated within their respective genus, and should be recognized as being functionally equivalent or structurally equivalent to the aspect shown or described.

Second, the only essential aspects of the apparatus are identified by the claims. Thus, aspects of the apparatus, including elements, acts, functions, and relationships (shown or described) should not be interpreted as being essential unless they are explicitly described and identified as being essential.

Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word "tacking" invokes stapling, gluing, etc., and all other modes of that word and similar words, such as "attaching").

Fourth, unless explicitly stated otherwise, conjunctive words (such as "or," "and," "including," "comprising," "comprises," and "comprised of," for example) should be interpreted in the inclusive—not the exclusive—sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be connected or coupled directly or via one or more intermediary channels or devices. As another example, devices may be connected or coupled in such a way that information can be passed there between, while not sharing any physical connection with one another. Additionally, the words "herein," "above," "below," and words of similar import when used in this application shall refer to this application as a whole and not to any particular portions of this application. Where the context permits, words in the Detailed Description using the singular or plural number may also include the plural or singular number respectively. The word "or" in reference to a list of two or more items covers all of the following interpretations of the word: any of the items in the list, all of the items in the list, and any combination of the items in the list. The words "has," "have," "having," or any variation thereof, should be interpreted as open terminology, thereby allowing for the inclusion of other components in addition to those recited meanings. If the specification states a component or feature "may," "can," "could," or "might" be included or have a characteristic, that particular component or feature is not required to be included or have the characteristic.

Fifth, the words "means" and "step" are provided to facilitate the reader's understanding of the apparatus and do not mean "means" or "step" as referenced in 35 U.S.C. 104 (f), unless used as "means for [function]" or "step for [function]" in the Claims section.

Sixth, the apparatus is also described in view of the Festo decisions, and, in that regard, the claims and the apparatus incorporate equivalents known, unknown, foreseeable, and unforeseeable.

Seventh, the language and each word used in the apparatus should be given the ordinary interpretation of the language and the word, unless indicated otherwise. The terminology used is intended to be interpreted in its broadest reasonable manner, even though such terminology is being used in conjunction with certain examples. The terms used in this specification generally have their ordinary meanings in the art within the context of the disclosure and in the specific context where each term is used. Listed in the subsection entitled, "Glossary," are definitions for specific terms. If a specific definition is listed for a given term, its purpose is to augment the ordinary meaning in the art for that term. In other words, to whatever degree the specific definition listed in the Glossary is broader than the ordinary meaning of the art, the definition listed in the Glossary will control to that degree. However, to whatever degree the ordinary meaning in the art of a term is broader than what is defined in the Glossary, the ordinary meaning of the art will control to that degree. As will be understood by those of ordinary skill in the art, various structures and devices may be depicted as block diagrams to avoid unnecessarily obscuring the apparatus.

Eighth, it should be noted in the following discussion that acts with like names are performed in like manners, unless otherwise stated. Of course, the foregoing discussions and definitions are provided for clarification purposes and are not limiting. Words and phrases are to be given their ordinary plain meaning unless indicated otherwise.

Ninth, while the present apparatus is described in terms of specific embodiments, it is to be understood that the apparatus is not limited to these disclosed embodiments. Upon reading the teachings of this disclosure many modifications and other embodiments of the apparatus will come to mind of those skilled in the art to which this apparatus pertains, and which are intended to be and are covered by both this disclosure and the appended claims. It is indeed intended that the scope of the apparatus be determined by proper interpretation and construction of the appended claims and their legal equivalents, as understood by those of skill in the art relying upon the disclosure in this specification and the attached drawings.

Tenth, for convenience, certain terms may be highlighted, for example using capitalization, italics, and/or quotation marks. The use of highlighting has no influence on the scope and meaning of a term; the scope and meaning of a term is the same in the same context whether or not it is highlighted. It will be appreciated that the same element can be described in more than one way. Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is for illustrative purposes and is not intended to further limit the scope and meaning of the disclosure or of any exemplified term. Likewise, the disclosure is not limited to various embodiments given in this specification.

Eleventh, reference in this specification to "one embodiment," "an embodiment," "this embodiment," "one aspect," "an aspect," or "this aspect" means that a particular feature, structure, or characteristic described in connection with the embodiment is included in at least one embodiment of the disclosure. The appearances of the phrase "in one embodiment" or "in one aspect" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Glossary

"Ambient audible sound" refers to audible sound capable of being detected by a microphone.

"Analog audio signal" refers to a representation of sound using a changing level of electrical voltage via an analog signal; in an analog audio signal, the instantaneous signal voltage varies continuously with the pressure of the sound waves.

"Analog signal" refers to a continuous signal representing some other quantity.

"Audible sound" refers to sound waves having a frequency between 20 Hz and 20 kHz.

"Audio signal" refers to a representation of sound, typically using either a digital audio signal or an analog audio signal.

"Digital audio signal" refers to a representation of sound using binary numbers via a digital signal.

"Digital signal" refers to a signal that represents data as a sequence of discrete values, including, but not limited to, a radio frequency (RF) signal, a Wi-Fi signal, a BLUETOOTH protocol signal, a TRUE WIRELESS STEREO (TWS) protocol signal, and the like.

"Input button" refers to a mechanism by which a user can activate or deactivate the apparatus.

"Integrated circuit" refers to the electronic circuitry that executes instructions comprising a computer program. The integrated circuit performs basic arithmetic, logic, controlling, and input/output (I/O) operations specified by the instructions in the integrated circuit's program. In this disclosure, "integrated circuit" further comprises (1) a means of communicating with a volume-control mechanism, (2) a means of communicating with an input button, (3) a means of communicating with a loudspeaker, (4) a means of communicating with a microphone, (5) a means of receiving electrical power from a battery, (6) a receiver capable of receiving at least one digital signal from at least one external source, (7) a transmitter capable of delivering at least one digital signal to at least one external device, (8) a means of converting an analog audio signal from the microphone into a digital audio signal for delivery to an external device via the transmitter, (9) a means of converting a digital audio signal into an analog audio signal, (10) a means of communicating an analog audio signal or a digital audio signal to the loudspeaker for conversion into audible sound, and (11) an antenna.

"Noise-cancelling material" refers to any material configured to prevent the ingress of audible sound, said material having a Sound Transmission Class rating of at least STC-40.

"Volume-control mechanism" refers to a mechanism capable of adjusting the volume of a loudspeaker.

"Water-resistant material" refers to any material configured to prevent ingress of water, said material having an Ingress Protection (IP) rating of at least IPX2.

Description of the Apparatus

In one embodiment, the suction cup headphone apparatus 100 comprises a suction cup, a loudspeaker unit 110, and a housing unit 112. The suction cup 102 comprises a suction container 802. The suction container 802 has an elastic characteristic. The suction container 802 is configured to surround a cavity 118. The suction container 802 comprises a proximal end 106 and a distal end 202. The distal end 202 has a first state 406. The distal end 202 is capable of being depressed. The distal end 202 is configured to adopt a second state 502 when the distal end 202 is depressed. The distal end 202 is configured to expel air from the cavity 118 when the distal end 202 adopts the second state 502. The distal end 202 is capable of reverting to the first state 406. The distal end 202 is configured to revert to the first state 406 when the distal end 202 is released. The distal end 202 is capable of causing air pressure inside the cavity 118 to fall when the distal end 202 reverts to the first state 406. The proximal end 106 comprises an annular suction lip 108. The annular suction lip 108 is configured to encircle an ear of the user 1802. The annular suction lip 108 is configured to contact a head of the user 1802 when the annular suction lip 108 encircles the ear. The suction container 802 is configured to enclose the ear when the annular suction lip 108 contacts the head. The suction cup 102 is configured to create a suction seal around the ear when the distal end 202 reverts to the first state 406 while the suction container 802 encloses the ear. The suction seal is capable of keeping the suction cup 102 in place over the ear until the suction cup is removed. The loudspeaker unit 110 is placed inside the cavity 118. The loudspeaker unit 110 is connected to the suction container 802. The loudspeaker unit 110 comprises a loudspeaker unit casing 710 and a set of internal components 1712. The set of internal components 1712 is mounted inside the loudspeaker unit casing 710. The set of internal components 1712 comprises a loudspeaker 1504, an integrated circuit 1502, and a battery 1506. The battery 1506 is connected to the loudspeaker 1504. The battery 1506 is connected to the integrated circuit 1502. The battery 1506 is configured to provide electrical power to the loudspeaker 1504. The battery 1506 is configured to provide electrical power to the integrated circuit 1502. The integrated circuit 1502 comprises a receiver 1706. The receiver 1706 is configured to receive at least one external audio signal from at least one external source 304. The integrated circuit 1502 is connected to the loudspeaker 1504. The integrated circuit 1502 is configured to amplify the at least one external audio signal. The integrated circuit 1502 is configured to deliver the at least one external audio signal to the loudspeaker 1504. The loudspeaker 1504 is configured to convert the at least one external audio signal into the audible sound 306. The loudspeaker 1504 is configured to direct the audible sound 306 toward the ear. The housing unit 112 is configured to receive the suction cup 102 and the loudspeaker unit 110. The housing unit 112 comprises a first housing unit 114. The first housing unit 114 comprises a first annular sidewall 904, a first flange 906 extending radially inwardly from the first annular sidewall 904, and a plurality of centering braces 908 that extend radially inwardly from the first annular sidewall 904 and perpendicularly from the first flange 906. The plurality of centering braces 908 is configured to apply direct pressure to the suction container 802. The plurality of centering braces 908 is configured to apply indirect pressure to the loudspeaker unit 110. The distal end 202 of the suction cup 102 is configured to protrude through the first flange 906.

In one embodiment, the loudspeaker unit casing 710 comprises a loudspeaker unit base 704, at least one loudspeaker unit sidewall 708, and a loudspeaker unit cap 706. In this embodiment, one loudspeaker unit sidewall 708 is utilized. Thus, in this embodiment, the loudspeaker unit sidewall 708 has a curved surface having the characteristics of a cylinder wall. However, in other embodiments, the loudspeaker unit casing 710 may use more than one loudspeaker unit sidewall 708. The loudspeaker unit base 704 is connected perpendicularly to the at least one loudspeaker unit sidewall 708 to form a base for the loudspeaker unit casing. The loudspeaker unit cap 706, being parallel to the loudspeaker unit base 704, is connected perpendicularly to the at least one loudspeaker unit sidewall 708. The loudspeaker unit base 704 is opposed to the loudspeaker unit cap 706. The set of internal components is mounted within the loudspeaker unit casing. The loudspeaker unit base 704 and the loudspeaker unit sidewall 708 are rigid and porous. As a result, air flow throughout the cavity 118 is enhanced—from the distal end 202 through the loudspeaker unit base 704 and through the loudspeaker unit sidewall 708 to the proximal end 106, and vice versa.

Figure 6:
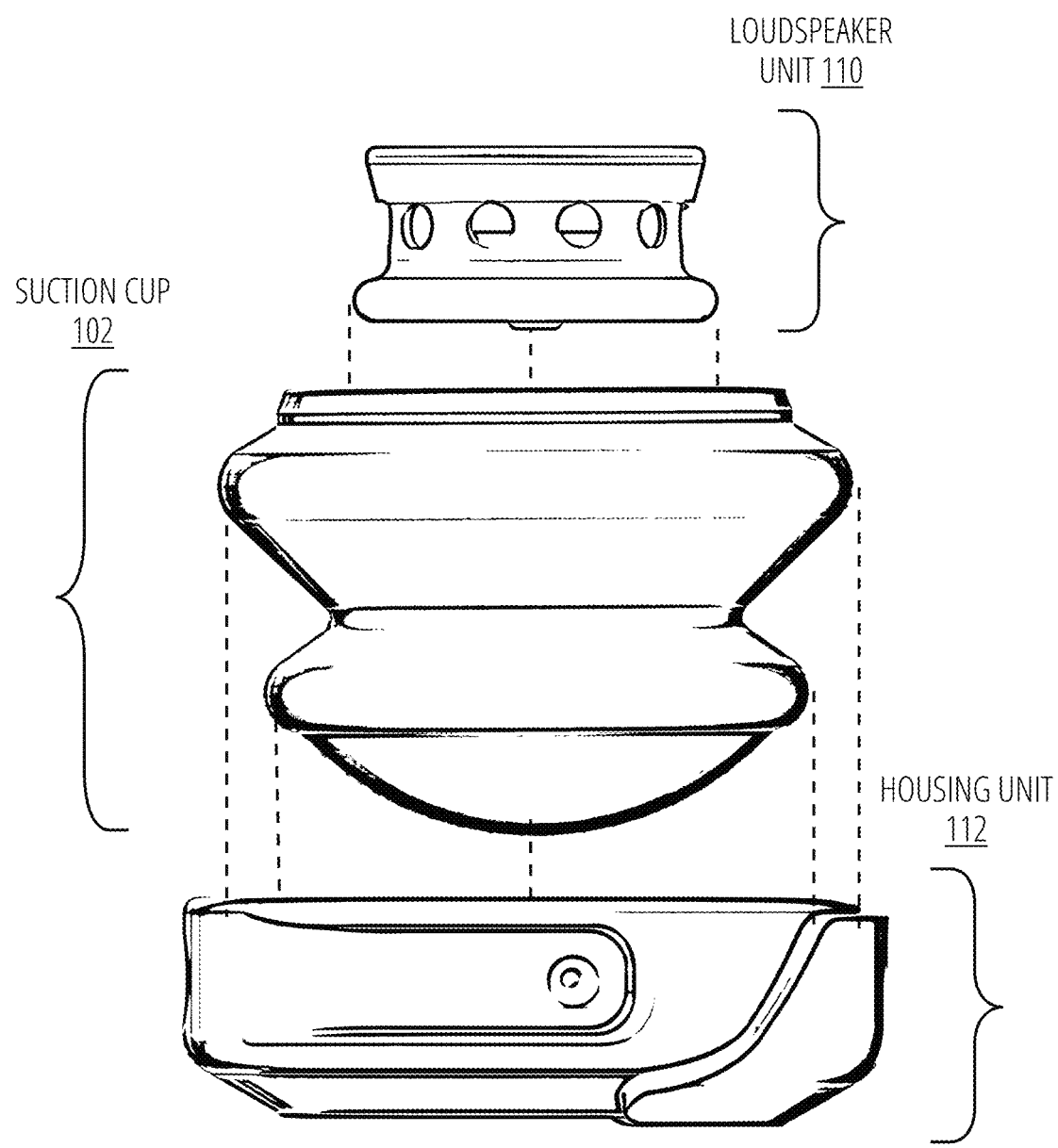
FIG. 6 is an exploded view of the suction cup headphone apparatus in accordance with one embodiment.

In one embodiment, the suction cup 102 has a bellows shape, according to the depiction in FIG. 6. Restated, the suction container 802 has the characteristics of a bellows. The suction cup 102 extends along an imaginary longitudinal axis from the proximal end 106 to the distal end 202. The distal end 202 is closed. The proximal end 106 is open. The proximal end 106 has an annular suction lip 108. Beginning at the annular suction lip 108 and moving along the longitudinal axis through the cavity 118 toward the distal end 202, each point of the axis serves as the center of an imaginary circular plane that is perpendicular to the longitudinal axis. The diameter of each circular plane extends to the suction container 802. The diameter of each circular plane varies, giving rise to a bellows-shaped.

In one embodiment, the suction cup 102 has a substantially conical shape, according to the depiction in FIG. 6. The suction cup 102 extends along an imaginary longitudinal axis from the proximal end 106 to the distal end 202. The distal end 202 is closed. The proximal end 106 is open. Beginning at the distal end 202 and moving along the longitudinal axis toward the proximal end 106, the exterior of the suction cup 102 extends outwardly like a cone.

In one embodiment, the suction cup 102 is comprised of a noise-cancelling material. This noise-cancelling material provides the same or better sound-blocking protection that would exist between rooms if the speech level is no louder than general conversation.

In one embodiment, the suction cup 102 is comprised of a water-resistant material. The water-resistant material provides, at the very least, protection against condensation or dripping water falling vertically, and against spraying water when tilted up to 15 degrees vertically.

In one embodiment, the distal end 202 is capable of being depressed. When the distal end 202 is depressed, the distal end 202 can compress air and force the air through the cavity 118 to the proximal end 106 and to the annular suction lip 108. The suction cup 102—including the suction container 802 and the annular suction lip 108—has elastic characteristics. The annular suction lip has a default state. When the suction container 802 encloses the user's ear and when the forced air is delivered to the annular suction lip 108, the annular suction lip 108 can expand. When the annular suction lip 108 expands, the compressed air is allowed to pass the annular suction lip 108. The distal end 202 is capable of going back to its first state 406. When the distal end 202 reverts to the first state 406, air pressure inside the cavity 118 falls. The annular suction lip 108 reverts to the default state. Thus, when the distal end 202 is depressed (i.e., the first state 406) and then released (i.e., the second state 502), the suction cup 102 is capable of causing air pressure inside the cavity 118 to fall. This, in turn, creates a suction seal at the annular suction lip 108 around the ear of the user 1802.

In one embodiment, the distal end 202 further comprises an air-vent valve 1402. By known means, the air-vent valve 1402 allows air to flow in one direction, which, in this embodiment, is out the distal end 202. When the distal end 202 is depressed, the air-vent valve 1402 is opened, and air is expelled from the distal end 202 through the air-vent valve 1402 and out the suction cup 102. Restated, when the distal end 202 is depressed, air is not directed toward the proximal end 106 or toward the annular suction lip 108; instead, air is directed to the air-vent valve 1402. The air-vent valve 1402, being configured to close after the distal end 202 reverts to the first state 406, will not allow air to return to the distal end 202 after the distal end 202 reverts to the first state 406. Thus, air pressure within the cavity 118 falls when the distal end 202 reverts to the first state 406. This reduction in air pressure allows the suction cup 102 to create a suction seal with the ear of the user 1802.

In one embodiment, the receiver 1706, by way of known means, is configured to receive at least one digital signal from at least one external source 304 via the antenna 1710. The integrated circuit 1502, by known means, is configured to determine if the digital signal is a digital audio signal 302. The integrated circuit 1502, by known means, is capable of converting a digital audio signal 302 into an analog audio signal (not depicted). The integrated circuit 1502, by known means, will amplify and deliver the digital audio signal 302—or a converted analog audio signal—to the loudspeaker 1504. The loudspeaker 1504, by known means, will convert the digital audio signal 302 or, as the case may be, the analog audio signal, into audible sound 306.

In one embodiment, the set of internal components 1712 is further comprised of a microphone 1702. The microphone 1702 is configured to communicate with the integrated circuit 1502 by known means. The microphone 1702 can detect ambient audible sound external to the apparatus, by known means. Ambient audible sound detected by the microphone 1702 can be converted, by known means, into an audio signal and be delivered to the integrated circuit 1502. In turn, the audio signal can be converted, by known means, into a digital audio signal (not depicted) by the integrated circuit 1502. The integrated circuit 1502 is further comprised of an internal transmitter 1708. The integrated circuit 1502 can then deliver this digital audio signal to an external device via the transmitter 1708 by known means. Thus, if the user is operating a smartphone, the user may speak into the microphone 1702, and the user's voice will be transmitted to the smartphone.

In one embodiment, the set of internal components 1712 is further comprised of a volume-control mechanism 1704. The volume-control mechanism 1704, by known means, is configured to communicate with the integrated circuit 1502 and with the loudspeaker 1504. The integrated circuit 1502 is configured to receive at least one digital signal from at least one external source 304, by known means. The audible sound 306 has a volume. By known means, the integrated circuit 1502 is configured to determine whether the digital signal contains at least one command to adjust the volume of the audible sound 306 coming from the loudspeaker 1504. By known means, the integrated circuit 1502 is configured to relay the at least one command to adjust the volume to the volume-control mechanism 1704. The volume-control mechanism 1704 is capable of interpreting the at least one command to adjust the volume by known means. The volume-control mechanisms 1704, by known means, is capable of adjusting the volume of the loudspeaker 1504 in accordance with the at least one command to adjust the volume.

In one embodiment, the loudspeaker unit casing 710 is further comprised of an input button 702. The input button 702 is configured to communicate with the integrated circuit 1502. The input button 702 is located on the loudspeaker unit base 704. When the user 1802 depresses the distal end 202 of the suction cup 102, the user 1802 can also apply indirect pressure upon the input button 702. Restated, when the user 1802 depresses the distal end 202, the elastic material of the suction cup 102 makes contact with the input button 702. Thus, the user 1802 can activate or deactivate the apparatus (as the case may be) by depressing the distal end 202—and by extension, the input button 702—for a predetermined duration or for a predetermined number of times within a predetermined length of time. The input button 702 is capable of delivering an activation signal or a deactivation signal to the integrated circuit 1502 by known means. The activation signal is configured to cause the integrated circuit to activate any or all of the components contained in the set of internal components. The deactivation signal is configured to cause the integrated circuit to deactivate any or all of the components contained in the set of internal components. Naturally, this implies that integrated circuit 1502 and the battery 1506 should remain, at least, on standby mode when the other internal components are deactivated so that the integrated circuit 1502 will be able to activate the other internal components when the input button 702 is depressed. In this embodiment, the at least one command to adjust the volume may be initiated when the user 1802 depresses the input button 702 for another predetermined duration or for another predetermined number of times within a predetermined length of time.

Because the suction cup headphone apparatus 100 fits one ear, the user 1802 will typically employ two apparatuses 100 simultaneously. In other situations, multiple users 1802 utilizing multiple apparatuses 100 may wish to listen to the same content. Thus, one embodiment provides a system for synchronizing the content of multiple apparatuses, the integrated circuit 1502 can transmit a digital audio signal to at least one other apparatus 100 by any or all of the following means: a radio frequency (RF) signal, an electromagnetic field (EMF), a Wi-Fi signal, a BLUETOOTH protocol signal, a TRUE WIRELESS STEREO (TWS) protocol signal, or by any other means of transmitting a digital signal. One apparatus 100 (referred to as the initial apparatus 1804) receives a digital audio signal 302 from an external source 304. The digital audio signal 302 comprises a left audio channel 1902 and a right audio channel 1904. The initial apparatus 1804 synchronizes with at least one receiving apparatus 1806 by known means to deliver the left audio channel 1902 or the right audio channel 1904 to the at least one receiving apparatus 1806. The at least one receiving apparatus 1806 converts the left audio channel 1902 or the right audio channel 1904 into audible sound 306. In this embodiment, the initial apparatus 1804 is configured to transmit the left audio channel 1902 and the right audio channel 1904 separately, as is normally done on traditional headphones, i.e., stereo sound. In turn, the at least one receiving apparatus 1806, by known means, is configured to select which audio channel will be converted to audible sound 306. Thus, one receiving apparatus 1806 may convert the left audio channel 1902 into audible sound 306, while another receiving apparatus 1806 may convert the right audio channel 1904 into audible sound 306. However, in other embodiments, the left audio channel 1902 and the right audio channel 1904 can be combined, and identical synchronized signals can be sent to one or more receiving apparatus 1806 by known means.

In one embodiment, the housing unit 112 is configured to receive the suction cup 102 and, by extension, the loudspeaker unit 110, which is contained within the cavity 118 of the suction cup 102. The housing unit 112 comprises a first housing unit 114. The first housing unit 114 comprises a first annular sidewall 904, a first flange 906 extending radially inwardly from the first annular sidewall 904, and a plurality of centering braces 908 that extend radially inwardly from the first annular sidewall 904 and perpendicularly from the first flange 906. The plurality of centering braces 908 is configured to apply direct pressure to the suction cup 102. By extension, the plurality of centering braces 908 is configured to apply indirect pressure to the loudspeaker unit 110. Thus, the loudspeaker unit 110 is secured inside the suction cup 102 when the suction cup 102 is secured inside the housing unit 112. The distal end 202 of the suction cup 102 is oriented to protrude through the first flange. This gives the user 1802 direct access to the distal end 202 of the suction cup 102 so that the user 1802 may engage the suction cup 102.

In one embodiment, the housing unit 112 is further comprised of a second housing unit 116. The second housing unit 116 has a second annular sidewall 1304 and a second flange 1302 extending radially inwardly from the second annular sidewall 1304. The second annular sidewall 1304 has a larger diameter than the first annular sidewall 904. The first housing unit 114 has an exterior side. The second housing unit 116 has an interior side. The interior side of the second housing unit 116 is mounted to the exterior side of the first housing unit 114. The distal end 202 of the suction cup 102 is configured to protrude through the first flange 906 and the second flange 1302. The first flange 906 and the second flange 1302 are connected. Other embodiments may include one or more additional annular sidewalls or one or more additional flanges similarly nested and connected with each other.

In one embodiment, the housing unit 112 further comprises a first power cord port 910, and a power distributor 902. The first power cord port 910 is mounted to the first annular sidewall 904. The first power cord port 910 is configured to receive electrical power from an external power source (not depicted). The power distributor 902 is connected to the first power cord port 910 and to the battery 1506. The power distributor 902 is configured to recharge the battery 1506 by delivering electrical power from the first power cord port 910 the battery 1506.

In one embodiment, a wire (not depicted) connects the power distributor 902 to the battery 1506. The wire runs from the power distributor 902 through the suction container 802 through the loudspeaker unit base 704 to the battery 1506. However, other embodiments may incorporate different means of delivering power from the battery 1506 to the loudspeaker unit base 704.

In one embodiment, the opening for first power cord port 104 is configured to receive power from an external power supply (not depicted) via a first power cord (not depicted). The first power cord is configured to connect to the external power supply. The first power cord is configured to pass from the external power supply through the housing unit 112, via the opening for first power cord port 104, to the first power cord port 910. The first power cord is configured to connect to the first power cord port 910. Thus, the apparatus can be powered by a direct connection to the power supply.

In one embodiment the battery 1506 is configured to deliver power to an external destination—such as another apparatus—via a second power cord 1604, the second power cord 1604 configured to connect to the battery 1506. The second power cord is configured to pass from the battery 1506 through the suction container 802. The second power cord is configured to pass from the suction container 802 through the loudspeaker unit base 704, through the loudspeaker unit base 704, and through the housing unit 112 to the external destination. The second power cord 1604 is configured to connect to the external destination.

In one embodiment the power distributor 902 is configured to deliver power to an external destination—such as another apparatus—via a second power cord 1604, the second power cord 1604 is configured to connect to the power distributor 902. The second power cord 1604 is configured to pass from the power distributor 902 through the housing unit 112 to the external destination. The second power cord 1604 is configured to connect to the external destination.

In one embodiment, the user 1802 activates the apparatus 100 and places the apparatus 100 on a table or some other surface. The user 1802 then adjusts the volume-control mechanism 1704 so that the user 1802 can listen to the audible sound 306 emanating from the apparatus 100 without placing the apparatus 100 on the user's ear.

In one embodiment, the apparatus has two optional headband jacks 402 located on the housing unit 112. The user 1802 can affix an optional headband 1602 to a first apparatus 100 by connecting one end of the optional headband 1602 to the two optional headband jacks 402 located on the housing unit 112. The user 1802 can then connect the optional headband 1602 to a second apparatus 100 by similar means. Thus, the first apparatus 100 can connect to one end of the optional headband 1602, while the second apparatus 100 could connect to the other end of the optional headband 1602. A second power cord 1604, as described above, can connect the first apparatus 100 to the second apparatus 100 so that the first apparatus can charge the battery 1506 of the second apparatus 100.

In one embodiment, the apparatus utilizes bone conduction technology. Using known means, the apparatus can deliver audible sound 306 from the loudspeaker to the user's eardrum through means of bone conduction.

FIG. 1 is a perspective view of the suction cup headphone apparatus in accordance with one embodiment. As depicted therein, the suction cup headphone apparatus 100 comprises a suction cup 102, a loudspeaker unit 110, and a housing unit 112. The housing unit 112 comprises a first housing unit 114, a second housing unit 116, and an opening for first power cord port 104. The suction cup 102 comprises a proximal end 106 and an annular suction lip 108. The suction cup 102 contains a cavity 118. The housing unit 112 provides support for the suction cup 102 and the loudspeaker unit 110. The user may place the proximal end 106 over the user's ear so that the annular suction lip 108 encircles the user's ear and contacts the user's head. When the suction cup is engaged, the suction cup 102 forms a suction seal with the user's ear and/or the user's head. The loudspeaker unit 110 receives at least one audio signal from at least one external source. The loudspeaker unit 110 converts the at least one audio signal into audible sound. The loudspeaker unit 110 directs the audible sound through the proximal end 106 into the user's ear. The user may also insert a first power cord (not depicted) into the opening for first power cord port 104 to recharge the battery (not depicted).

Figure 2:
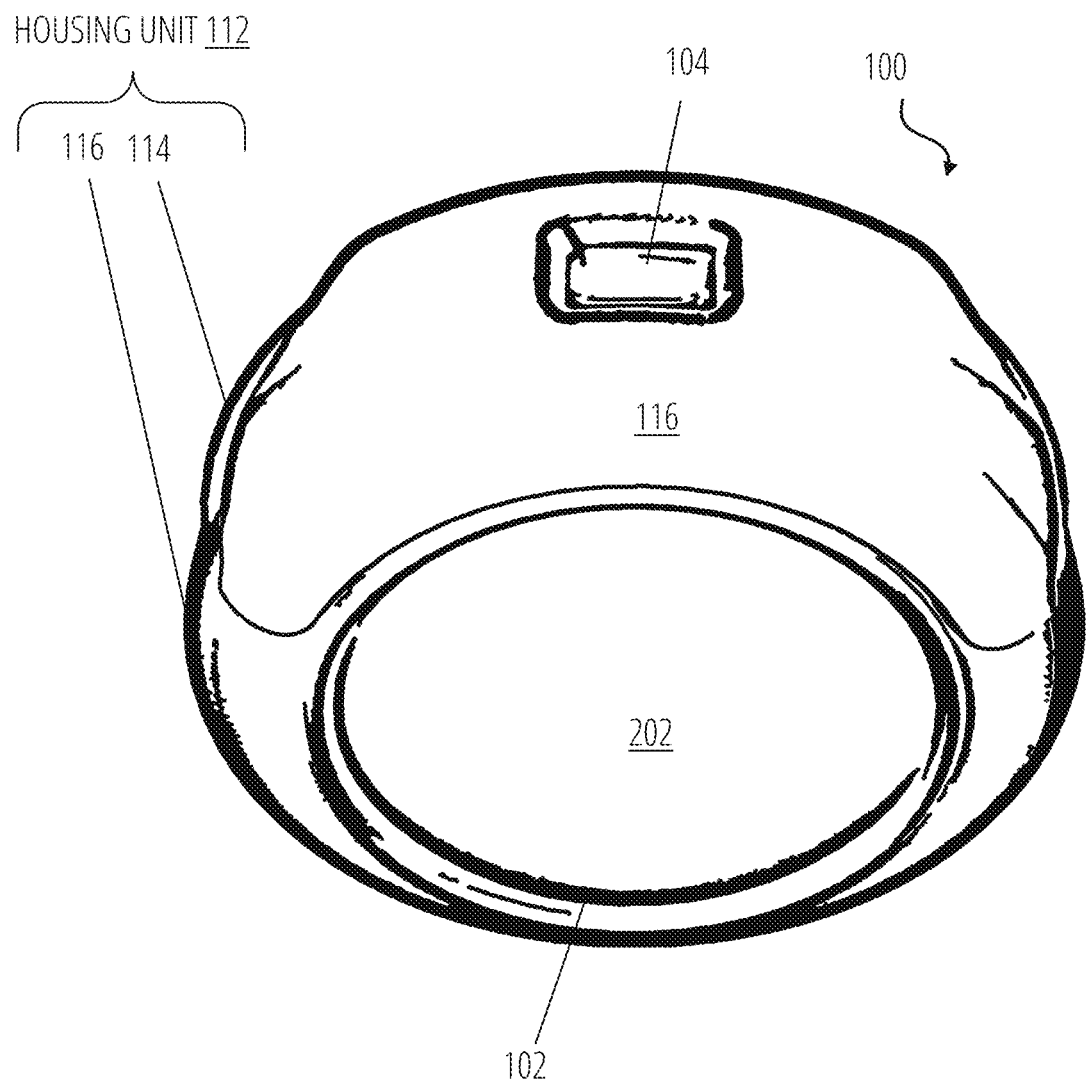
FIG. 2 is a perspective view of the suction cup headphone apparatus in accordance with one embodiment.

FIG. 2 is a perspective view of the suction cup headphone apparatus in accordance with one embodiment. As depicted therein, the suction cup headphone apparatus 100 comprises a housing unit 112 and a suction cup 102. The housing unit 112 comprises a first housing unit 114, a second housing unit 116, and an opening for first power cord port 104. The suction cup 102 has a distal end 202. The user may activate the suction cup 102 by depressing the distal end 202 one or more times. The user may also insert a first power cord (not depicted) into the opening for first power cord port 104 to recharge the battery (not depicted).

Figure 3:
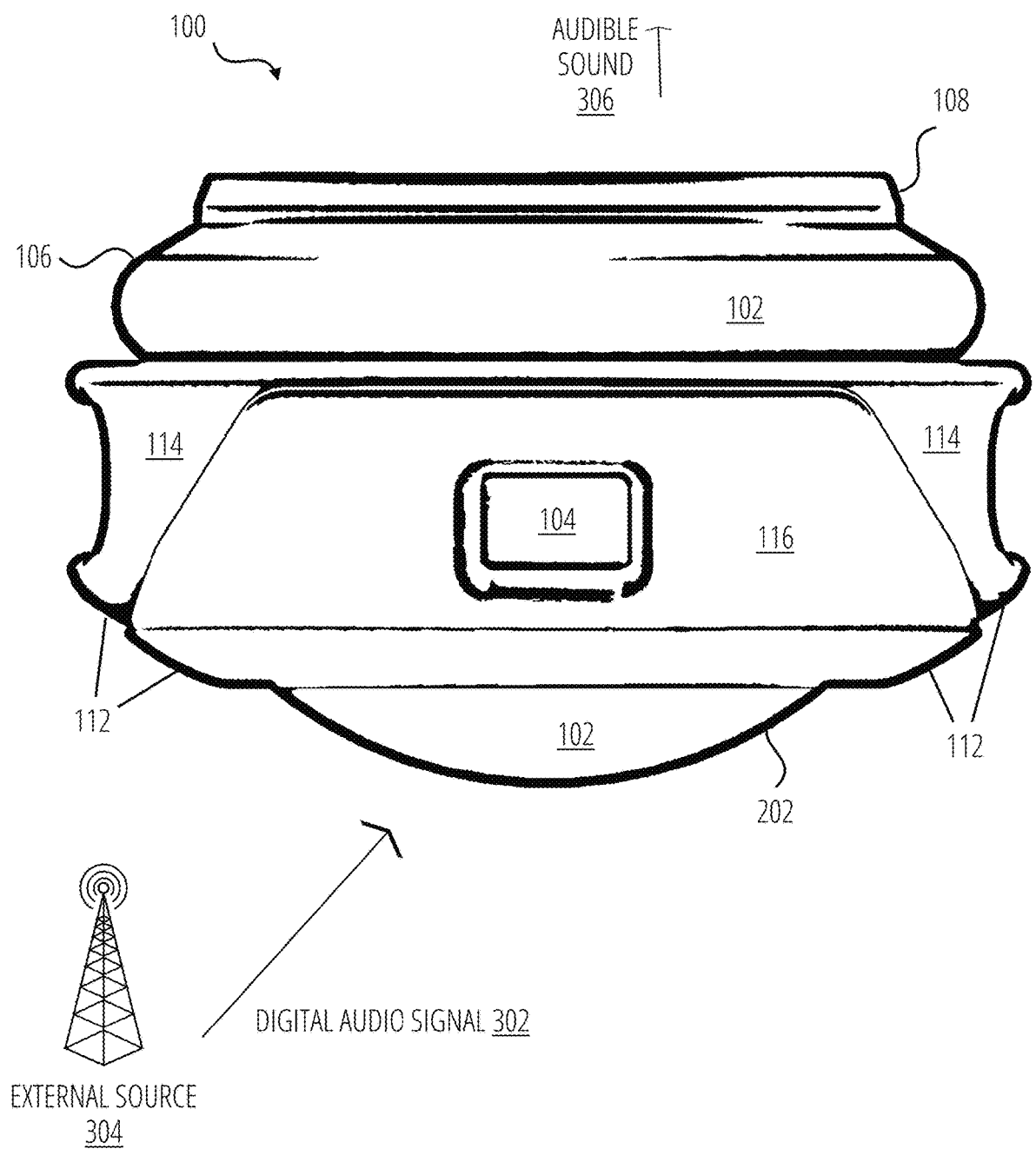
FIG. 3 is a side view of the suction cup headphone apparatus in accordance with one embodiment.

FIG. 3 is a side view of the suction cup headphone apparatus in accordance with one embodiment. As depicted therein, the suction cup headphone apparatus 100 comprises a housing unit 112 and a suction cup 102. The housing unit 112 is further comprised of a first housing unit 114, a second housing unit 116, and an opening for first power cord port 104. The suction cup 102 has a proximal end 106, an annular suction lip 108, and a distal end 202. The user may place the proximal end 106 over the user's ear, so that the annular suction lip 108 encircles the user's ear and contacts the user's head. The user may then engage the suction cup 102 by depressing the distal end 202 one or more times. This creates a suction seal with the user's ear and/or the user's head. The user may also insert a first power cord (not depicted) into the opening for first power cord port 104 to recharge the battery (not depicted). In this embodiment, a digital audio signal 302 is transmitted from an external source 304 to the suction cup headphone apparatus 100, which converts the digital audio signal 302 into audible sound 306 for delivery to the user.

Figure 4:
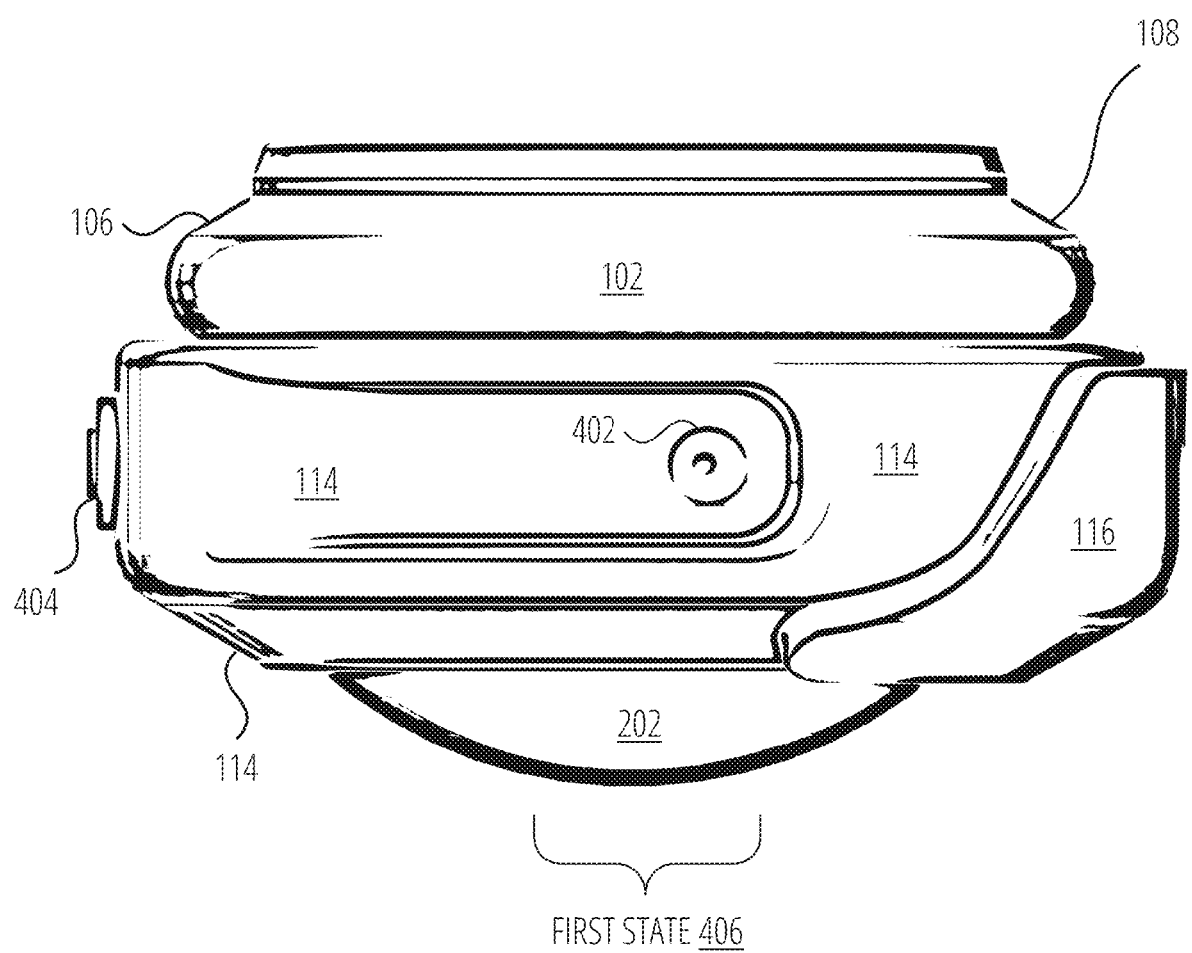
FIG. 4 is a side view of the suction cup headphone apparatus in accordance with one embodiment.

FIG. 4 is a side view of the suction cup headphone apparatus in accordance with one embodiment. As depicted therein, the suction cup headphone apparatus 100 comprises a suction cup 102 and a housing unit 112. The suction cup 102 has a proximal end 106, an annular suction lip 108, and a distal end 202. The housing unit 112 comprises a first housing unit 114, a second housing unit 116, an optional headband jack 402, and a second power cord port 404. The user may place the proximal end 106 over the user's ear, so that the annular suction lip 108 encircles the user's ear and contacts the user's head. The user may then engage the suction cup 102 by depressing the distal end 202 one or more times. When engaged, the suction cup 102 creates a suction seal with the user's ear and/or the user's head. The user may also insert a second power cord (not depicted) to deliver power from the suction cup headphone apparatus 100 to an external device. The optional headband jack 402 enables the user to connect the suction cup headphone apparatus 100 to an optional headband (not depicted). Here the distal end 202 assumes the first state 406.

Figure 5:
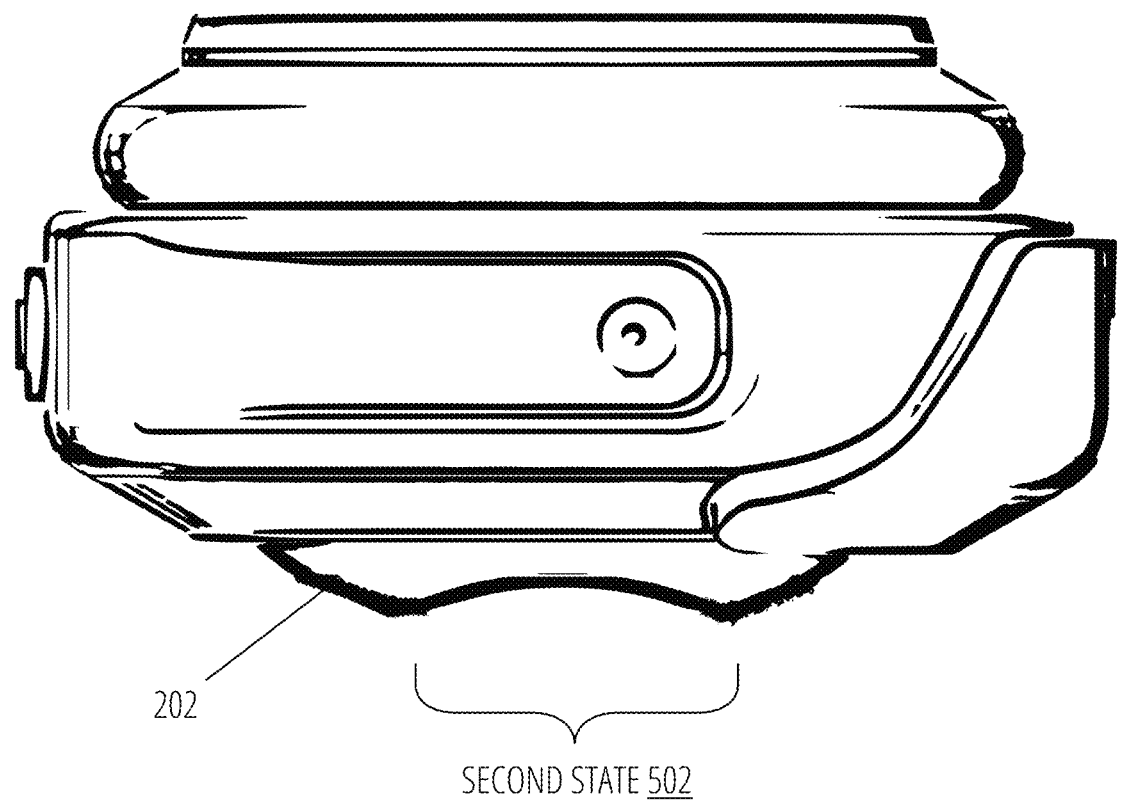
FIG. 5 is a side view of the suction cup headphone apparatus in accordance with one embodiment.

FIG. 5 is a side view of the suction cup headphone apparatus in accordance with one embodiment. This depiction is identical in every respect to FIG. 4, except that the distal end 202 is depressed, and therefore, assumes the second state 502.

FIG. 6 is an exploded view of the suction cup headphone apparatus in accordance with one embodiment. As depicted therein, the three primary components of the suction cup headphone apparatus 100 are in view: a suction cup 102, a loudspeaker unit 110, and a housing unit 112. The loudspeaker unit 110 is placed inside the suction cup 102. The suction cup 102 is placed inside the housing unit 112.

Figure 7:
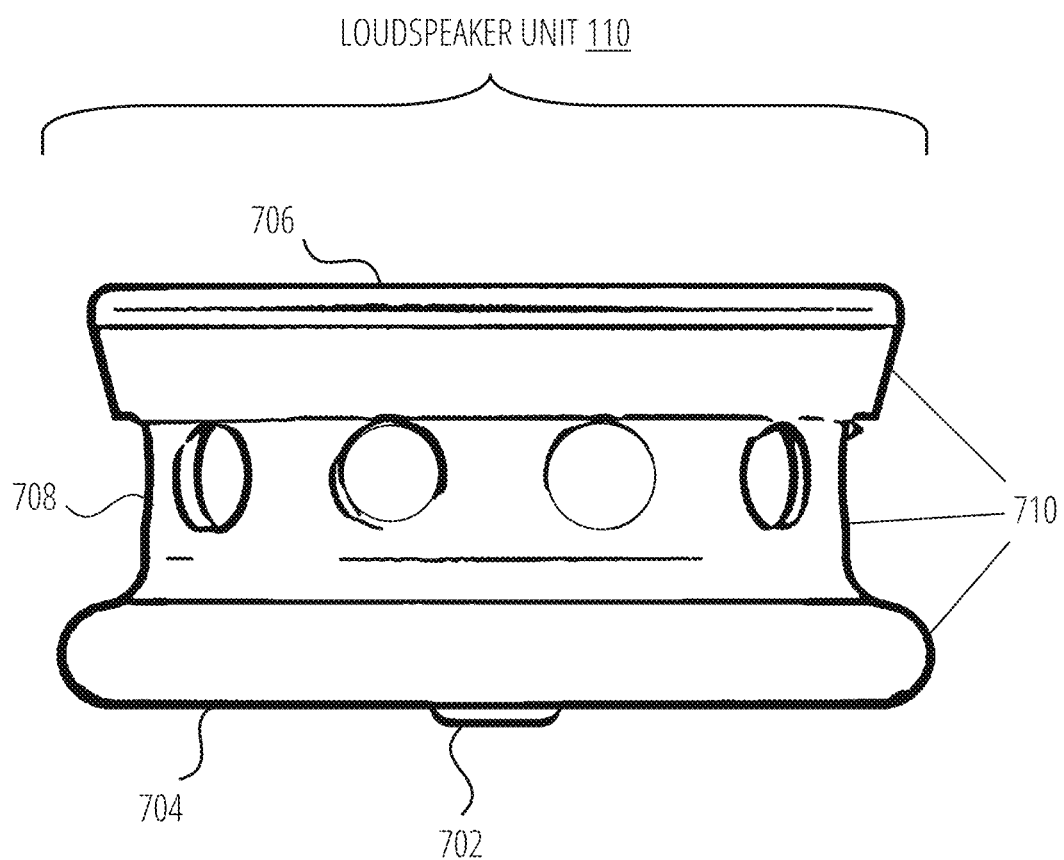
FIG. 7 is a side view of the loudspeaker unit in accordance with one embodiment.

FIG. 7 is a side view of the loudspeaker unit in accordance with one embodiment. The loudspeaker unit casing 710 of the loudspeaker unit 110 is depicted therein. The loudspeaker unit casing 710 comprises an input button 702, a loudspeaker unit base 704, a loudspeaker unit cap 706, and a loudspeaker unit sidewall 708. The loudspeaker unit cap 706 projects audible sound that is produced by the loudspeaker unit 110. The loudspeaker unit sidewall 708 and the loudspeaker unit base 704 are rigid. However, the loudspeaker unit sidewall 708 and the loudspeaker unit base 704 have porous characteristics. Thus, air is permitted to pass through the loudspeaker unit 110.

Figure 8:
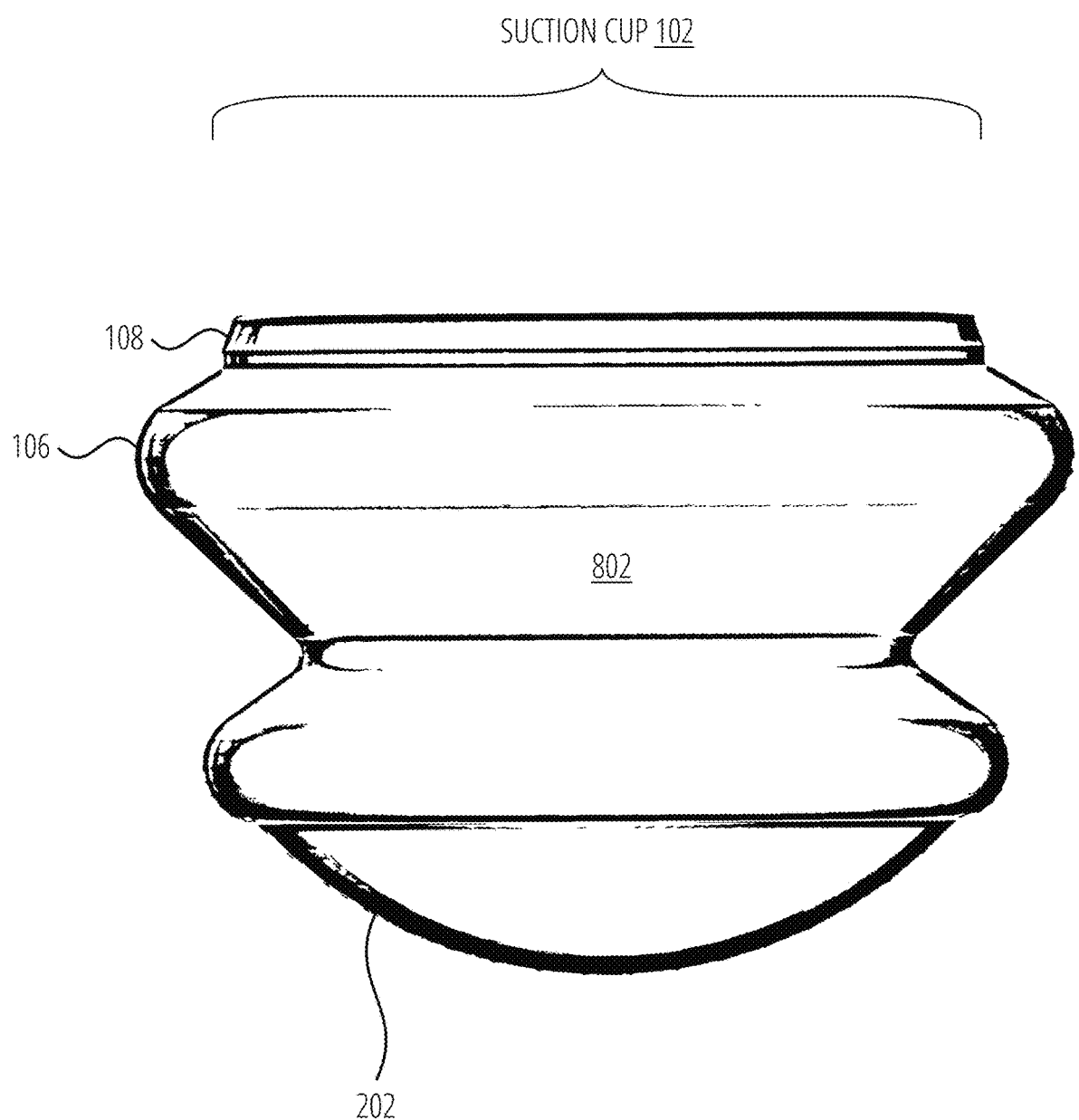
FIG. 8 is a side view of the suction cup in accordance with one embodiment.

FIG. 8 is a side view of the suction cup in accordance with one embodiment. The suction cup 102 comprises a suction container 802 having a bellows shape. The suction container 802 also has a conical shape. The suction cup 102 has a proximal end 106 and a distal end 202. The proximal end 106 has an annular suction lip 108.

Figure 9:
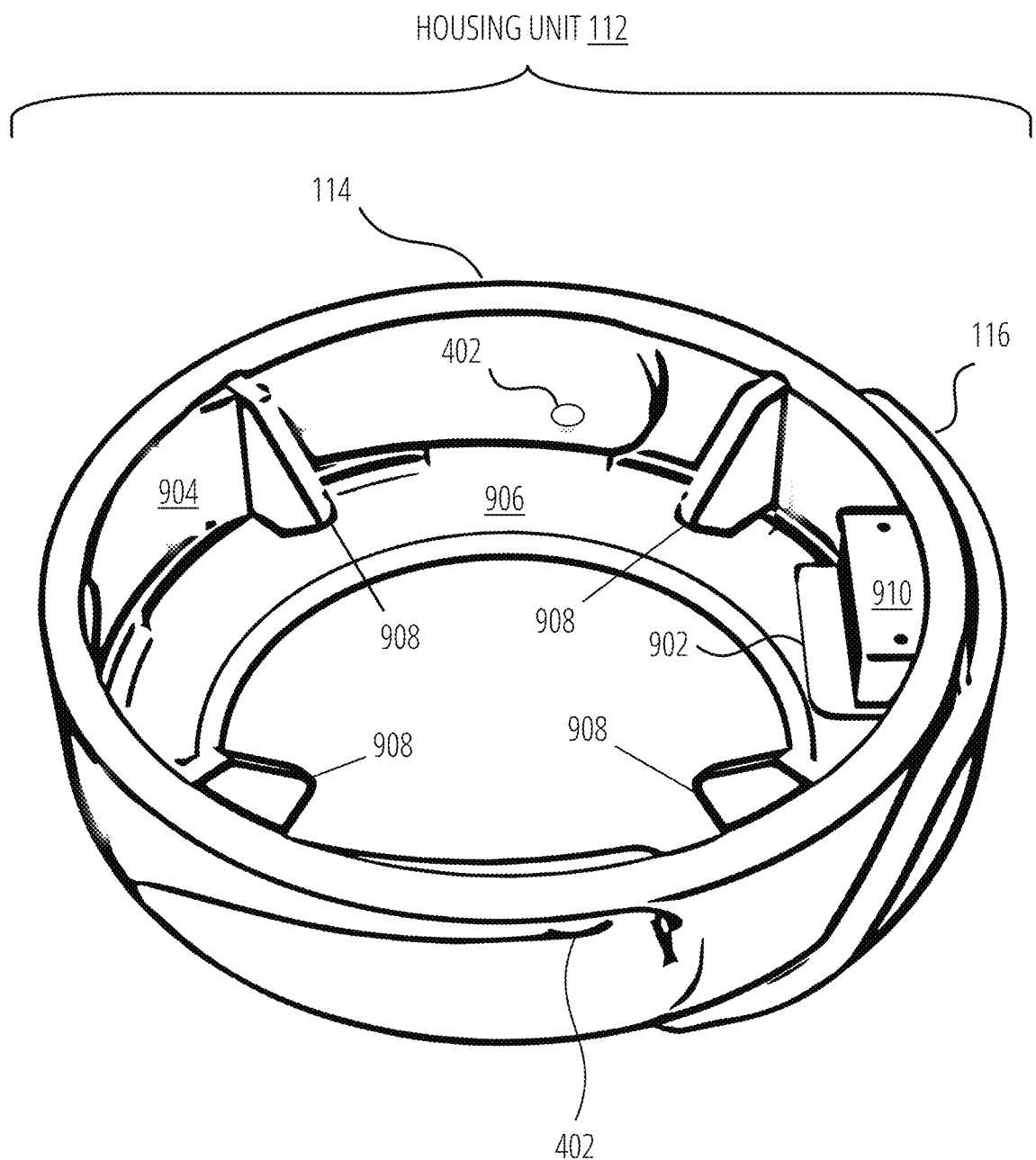
FIG. 9 is a perspective view of the housing unit in accordance with one embodiment.

FIG. 9 is a perspective view of the housing unit in accordance with one embodiment. The housing unit 112 comprises a first housing unit 114 and a second housing unit 116. The first housing unit 114 comprises a first annular sidewall 904, a first flange 906 extending radially inwardly from the first annular sidewall 904, and a plurality of centering braces 908. The first annular sidewall 904 is connected to the first flange 906. The plurality of centering braces 908 is connected to the first annular sidewall 904 and the first flange 906. The housing unit 112 is configured to receive the suction cup (not depicted) and, by extension, the loudspeaker unit (not depicted), which is contained within the suction cup. The plurality of centering braces is configured to apply direct pressure to the suction cup. By extension, the plurality of centering brace is configured to apply indirect pressure to the loudspeaker unit (not depicted). Thus, the loudspeaker unit is secured inside the suction cup, as the suction cup is secured inside the housing unit 112. The distal end (not depicted) is free to protrude through the first flange 906. This gives the user direct access to the distal end of the suction cup so that the user may engage the suction cup.

Figure 10:
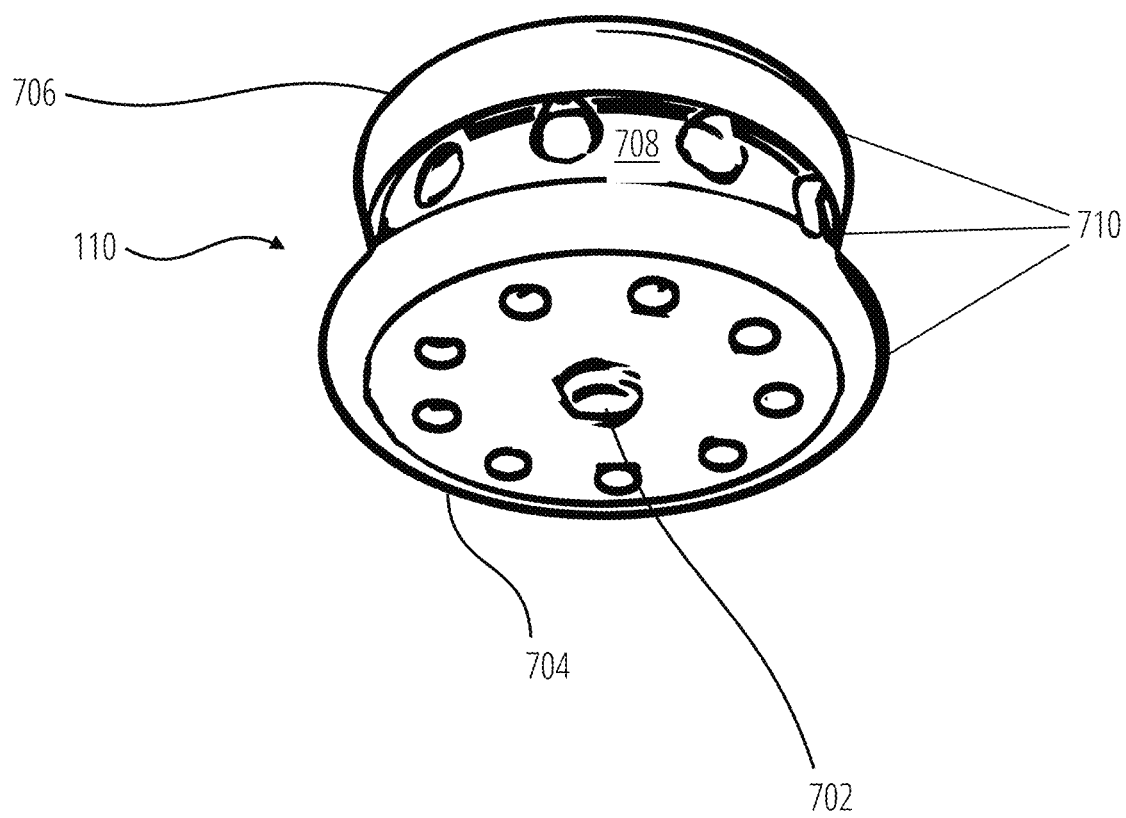
FIG. 10 illustrates a perspective view of the loudspeaker unit in accordance with one embodiment.

FIG. 10 illustrates a perspective view of the loudspeaker unit in accordance with one embodiment. As depicted therein, the loudspeaker unit casing for the loudspeaker unit 110 comprises a loudspeaker unit base 604, a loudspeaker unit cap 706, and a loudspeaker unit sidewall 708. The loudspeaker unit base 704 further comprises an input button 702. The loudspeaker unit cap 706 projects audible sound that is produced by the loudspeaker unit 110. The loudspeaker unit sidewall 708 and the loudspeaker unit base 704 are rigid. However, the loudspeaker unit sidewall 708 and the loudspeaker unit base 704 have porous characteristics. Thus, air is permitted to pass through the loudspeaker unit 110.

Figure 11:
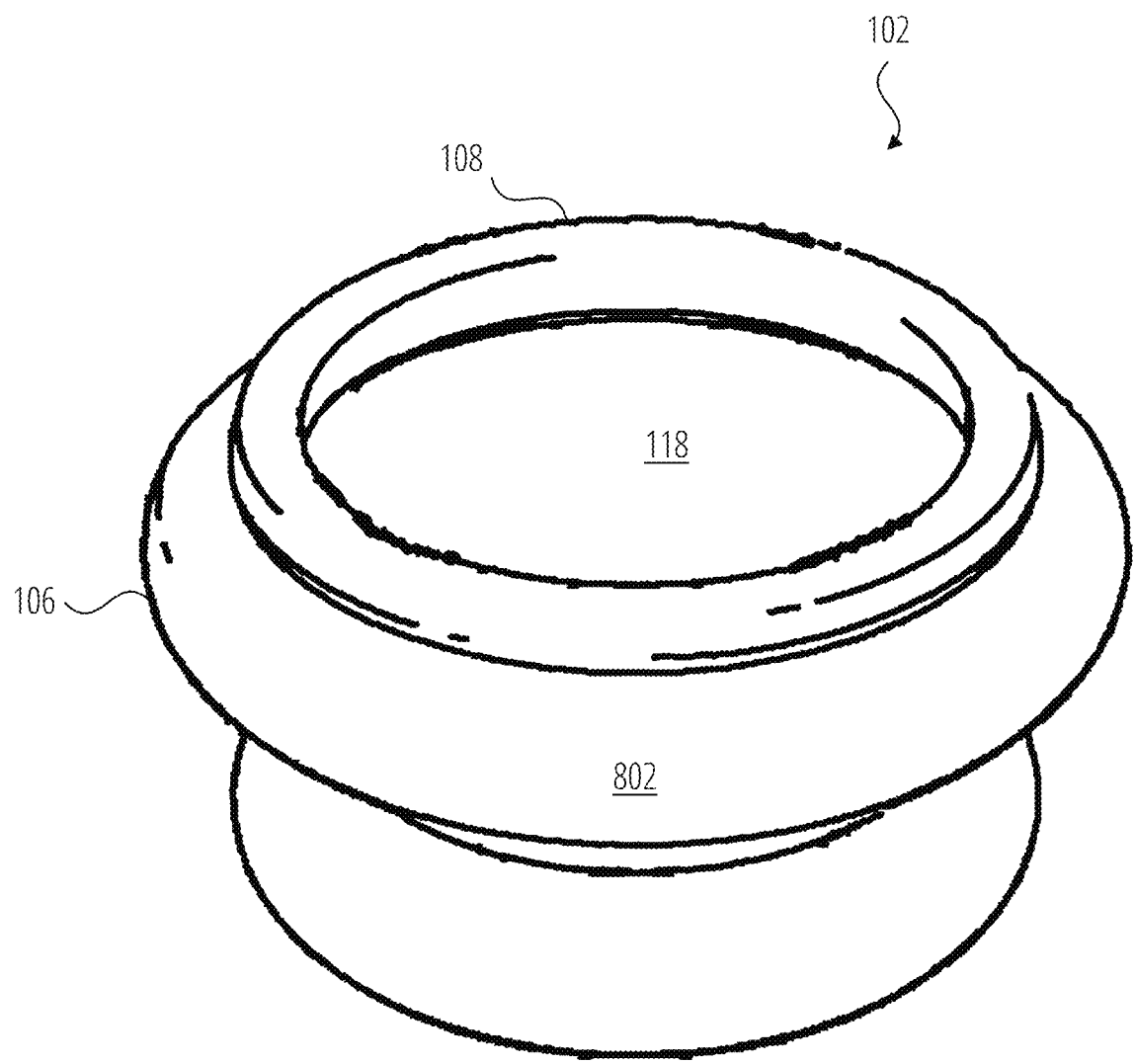
FIG. 11 illustrates a perspective view of the suction cup in accordance with one embodiment.

FIG. 11 illustrates a perspective view of the suction cup in accordance with one embodiment. The suction cup comprises a suction container 802. The suction container 802 has characteristics of a bellows. The suction container 802 has elastic characteristics. The suction container 802 forms the exterior of the suction cup 102. The suction container 802 surrounds a cavity 118. The suction cup 102 has a proximal end 106, an annular suction lip 108, a cavity 118, and a distal end (not depicted).

Figure 12:
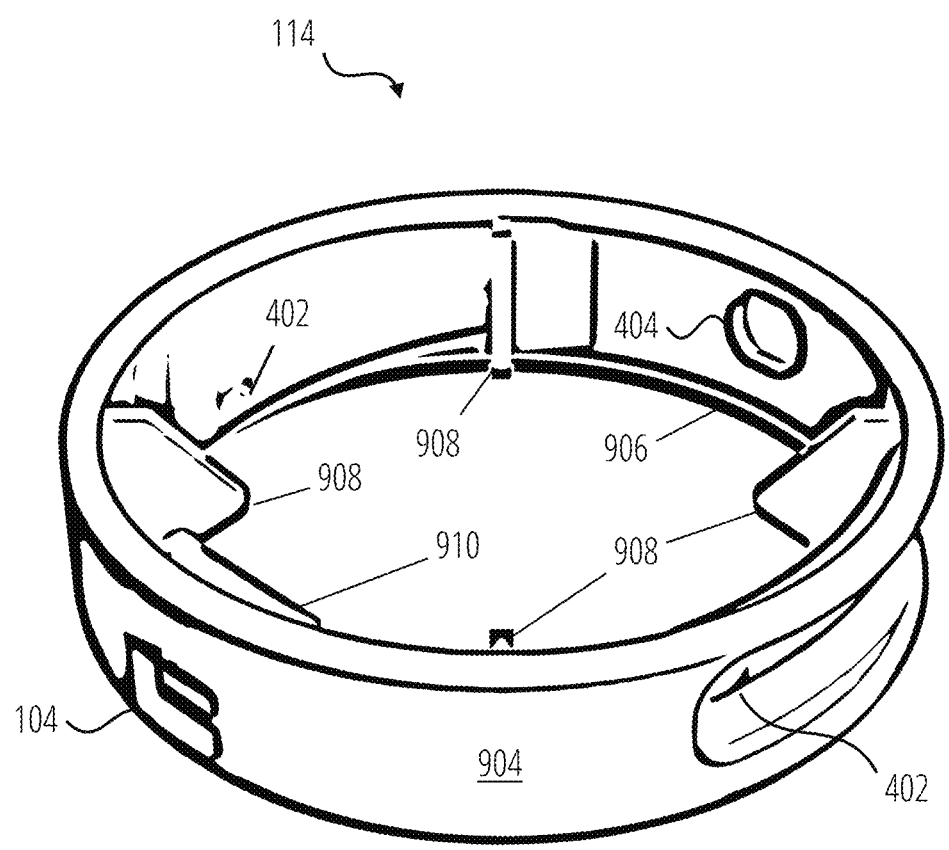
FIG. 12 illustrates a perspective view of the first housing unit in accordance with one embodiment.

FIG. 12 illustrates a perspective view of the first housing unit in accordance with one embodiment. As depicted therein, the first housing units 114 comprises an opening for first power cord port 104, an optional headband jack 402, a second power cord port 404, a first annular sidewall 904, a first flange 906, and a plurality of centering braces 908. The first annular sidewall 904 and the first flange 906 are capable of holding the suction cup (not depicted) while enabling the user to access the distal end (not depicted) of the suction cup. The plurality of centering braces 908 are designed to apply direct pressure to the suction cup and indirect pressure to the loudspeaker unit (not depicted). The opening for first power cord port 104 is capable of receiving a first power cord (not depicted) to connect with the first power cord port 910. The second power cord port 404 is capable of receiving a second power cord (not depicted). The optional headband jack 402 is capable of connecting with an optional headband (not depicted).

Figure 13:
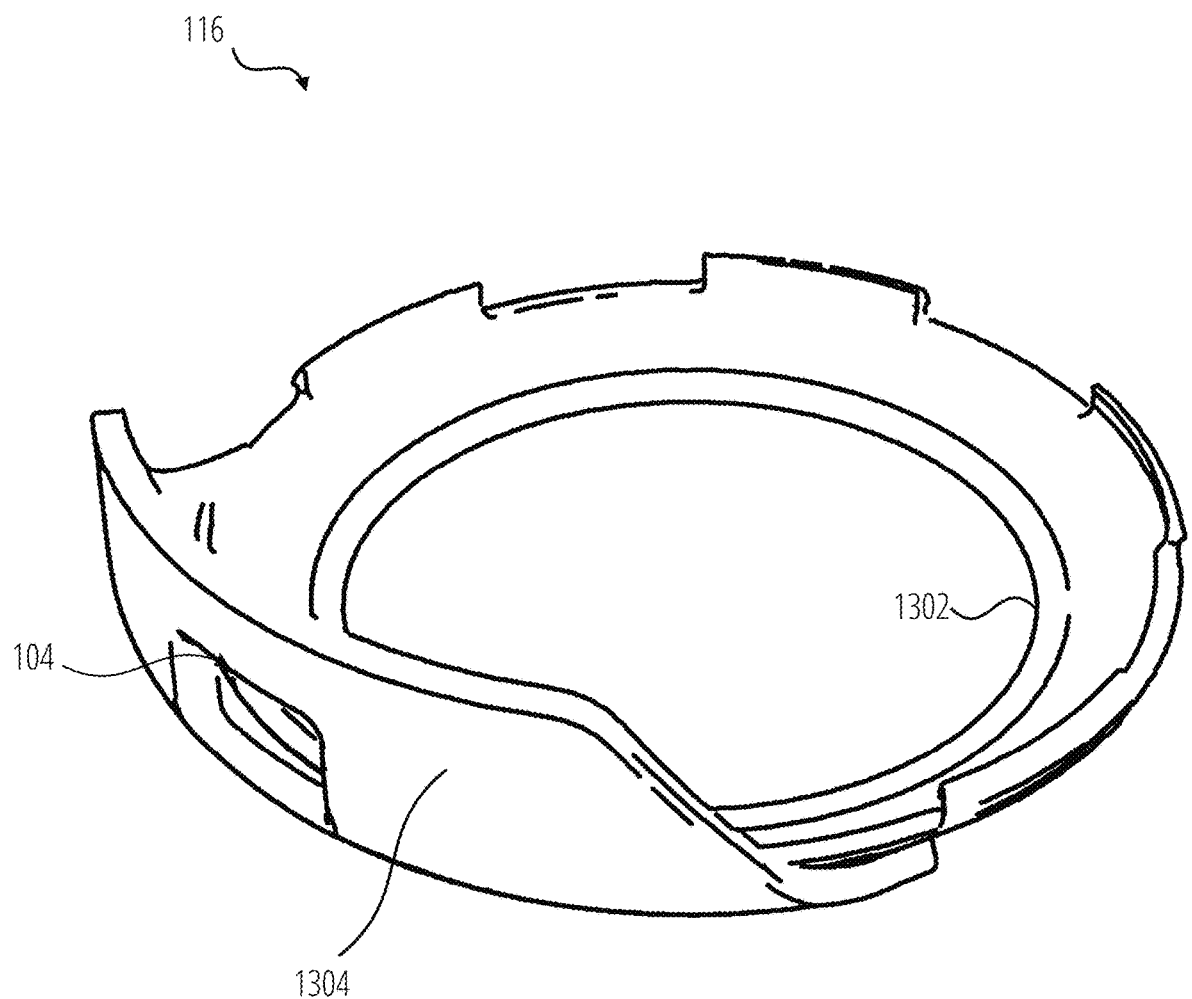
FIG. 13 illustrates a perspective view of the second housing unit in accordance with one embodiment.

FIG. 13 illustrates a perspective view of the second housing unit in accordance with one embodiment. As depicted therein, the second housing unit 116 has a second annular sidewall 1304 and a second flange 1302 extending radially inwardly from the second annular sidewall 1304. The second annular sidewall 1304 has a larger diameter than the first annular sidewall 904. The second housing unit also has an opening for first power cord port 104 so that a first power cord (not depicted) can engage with the first power cord port (not depicted).

Figure 14:
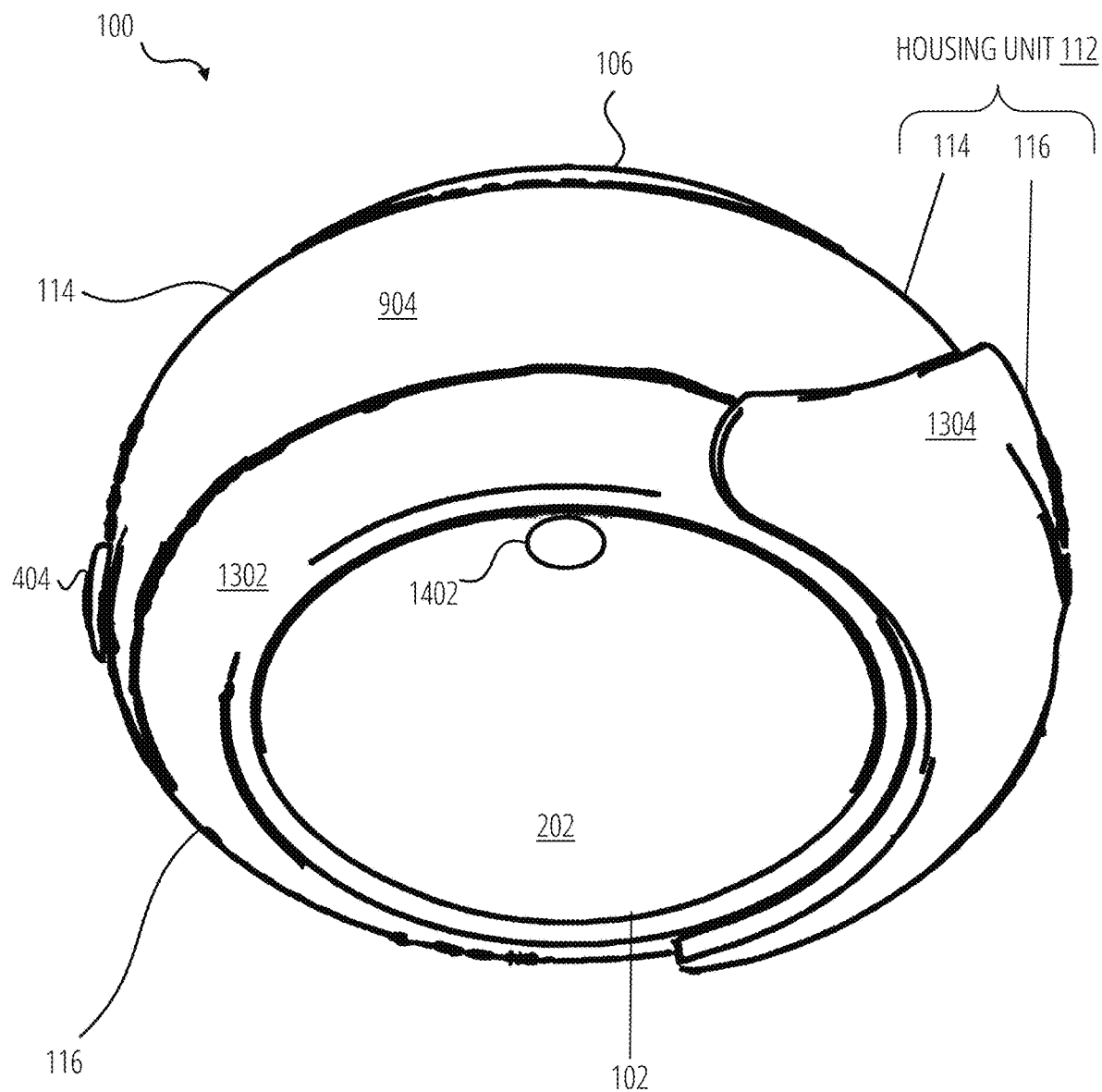
FIG. 14 illustrates an perspective view of the suction cup headphone apparatus in accordance with one embodiment.

FIG. 14 illustrates an perspective view of the suction cup headphone apparatus in accordance with one embodiment. As depicted therein, the suction cup headphone apparatus 100 comprises a suction cup 102 and a housing unit 112. The suction cup 102 further comprises a proximal end 106 and a distal end 202. The housing unit 112 further comprises a first housing unit 114 and a second housing unit 116. The first housing unit 114 comprises a first annular sidewall 904. The second housing unit 116 comprises a second annular sidewall 1304, a second flange 1302 extending radially inwardly from the second annular sidewall 1304, and a second power cord port 404. The second annular sidewall 1304 has a larger diameter than the first annular sidewall 904. The second housing unit 116 is mounted to the first housing unit 114. The distal end 202 of the suction cup 102 is configured to protrude through the second flange 1302. The distal end 202 comprises an air-vent valve 1402. When the distal end is depressed, air is forced from the cavity (not depicted) through the air-vent valve 1402. The air-vent valve 1402 prevents air from going back to the cavity.

Figure 15:
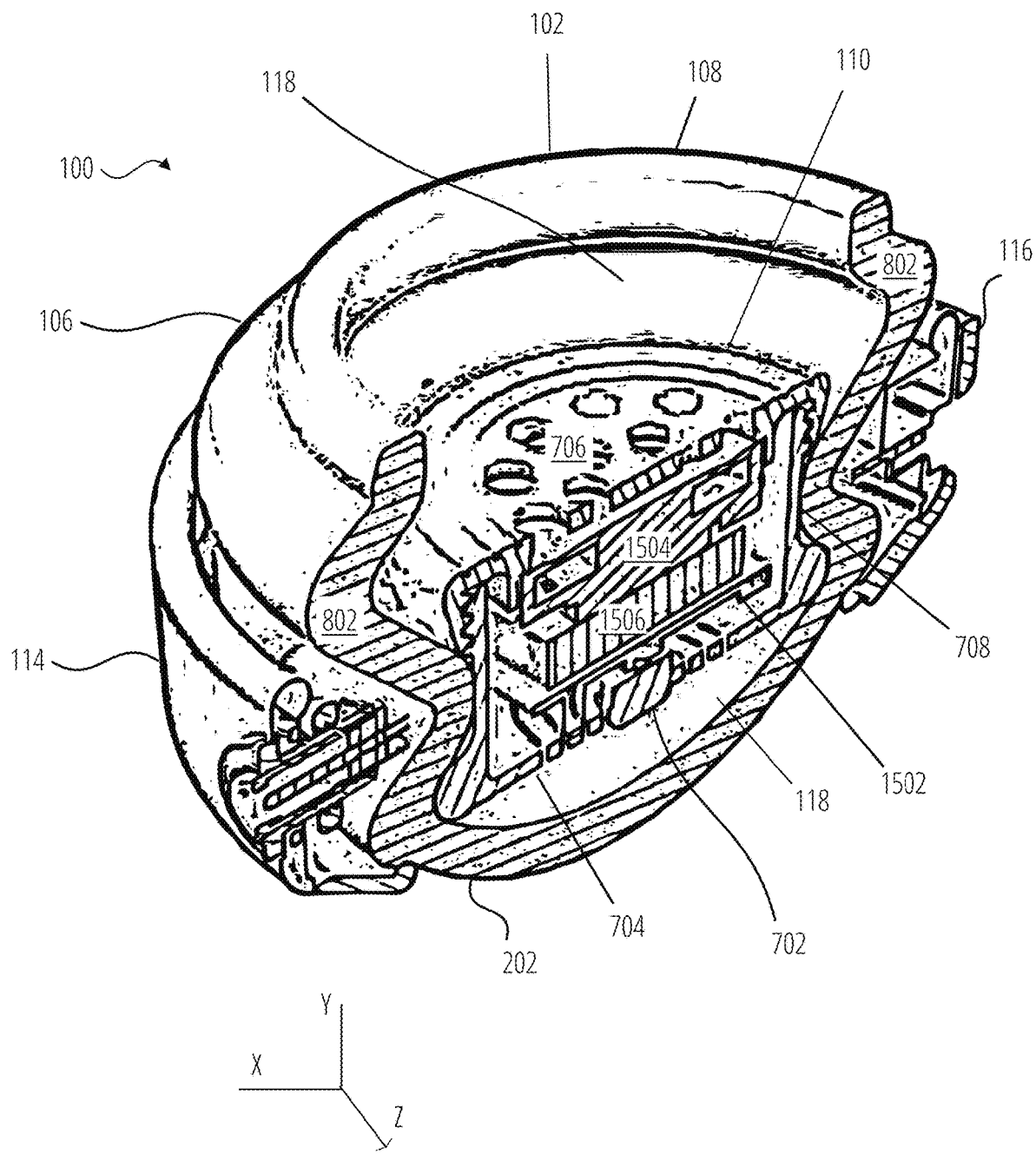
FIG. 15 illustrates an sectional view of the suction cup headphone apparatus in accordance with one embodiment.

FIG. 15 illustrates an sectional view of the suction cup headphone apparatus in accordance with one embodiment. A sectional view of the suction cup headphone apparatus 100 is depicted therein. The suction cup headphone apparatus 100 comprises a first housing unit 114, a second housing unit 116, a suction cup 102, and a loudspeaker unit 110. The suction cup is comprised of a suction container 802 that surrounds a cavity 118. The suction cup has a proximal end 106 and a distal end 202. The proximal end 106 has an annular suction lip 108. The loudspeaker unit 110 is placed inside the suction cup 102, bifurcating the cavity. The loudspeaker unit has a loudspeaker unit casing. The casing comprises a loudspeaker unit base 704, a loudspeaker unit cap 706, and a loudspeaker unit sidewall 708. The loudspeaker loudspeaker unit base 704 has an input button 702. Although the loudspeaker unit base 704 and the loudspeaker unit sidewall 708 are rigid, the loudspeaker unit base 704 and the loudspeaker unit sidewall 708 have porous characteristics. This enables air to pass freely throughout the cavity 118. The loudspeaker unit 110 further comprises an integrated circuit 1502, a loudspeaker 1504, and a battery 1506. The integrated circuit 1502 and the loudspeaker 1504 are connected to the battery 1506.

Figure 16:
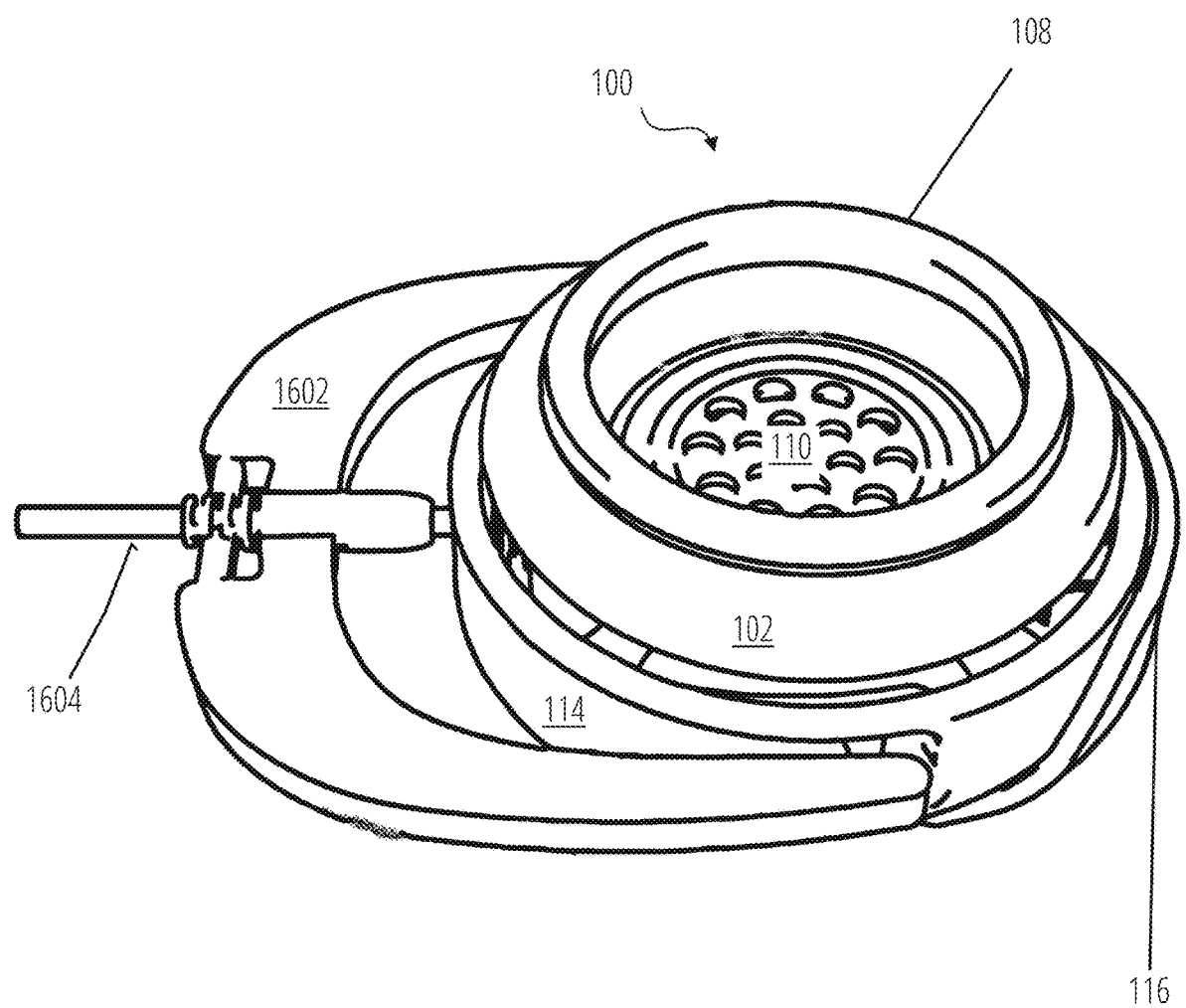
FIG. 16 illustrates a perspective view of the suction cup headphone apparatus in accordance with one embodiment.

FIG. 16 illustrates a perspective view of the suction cup headphone apparatus in accordance with one embodiment. As depicted therein, the suction cup headphone apparatus 100 comprises a suction cup 102, an annular suction lip 108, a loudspeaker unit 110, a first housing unit 114, a second housing unit 116, an optional headband 1602, and a second power cord 1604.

Figure 17:
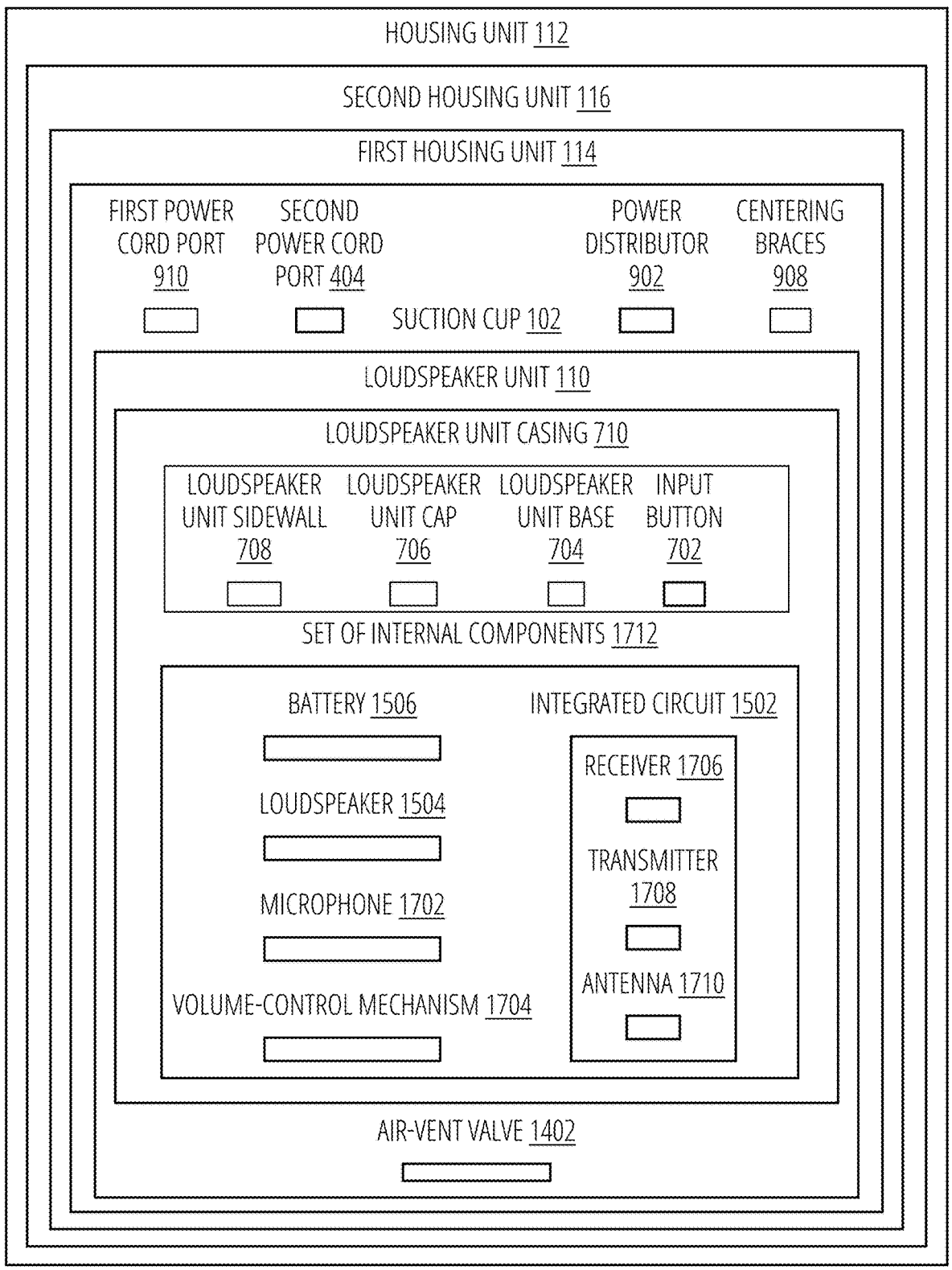
FIG. 17 illustrates a block diagram listing the components of the suction cup headphone apparatus in accordance with one embodiment.

FIG. 17 illustrates a block diagram listing the components of the suction cup headphone apparatus in accordance with one embodiment. The diagram depicts the locations of the various components relative to each other. An integrated circuit 1502 is comprised of a receiver 1706, a transmitter 1708, and an antenna 1710. A set of internal components 1712 is comprised of the integrated circuit 1502, a battery 1506, a loudspeaker 1504, a volume-control mechanism 1704, and a microphone 1702. The loudspeaker unit 110 is comprised of the set of internal components 1712 and a loudspeaker unit casing 710. The loudspeaker unit casing is comprised of a loudspeaker unit sidewall 708, a loudspeaker unit base 704, a loudspeaker unit cap 706, and an input button 702. The loudspeaker unit 110 and an air-vent valve 1402 are contained within a suction cup 102. The suction cup 102, a first power cord port 910, a second power cord port 404, a power distributor 902, and centering braces 908 are contained within a first housing unit 114. The first housing unit 114 is contained within a second housing unit 116. The first housing unit 114 and the second housing unit 116 comprise the housing unit 112. The suction cup headphone apparatus 100 is comprised of each of these components.

Figure 18:
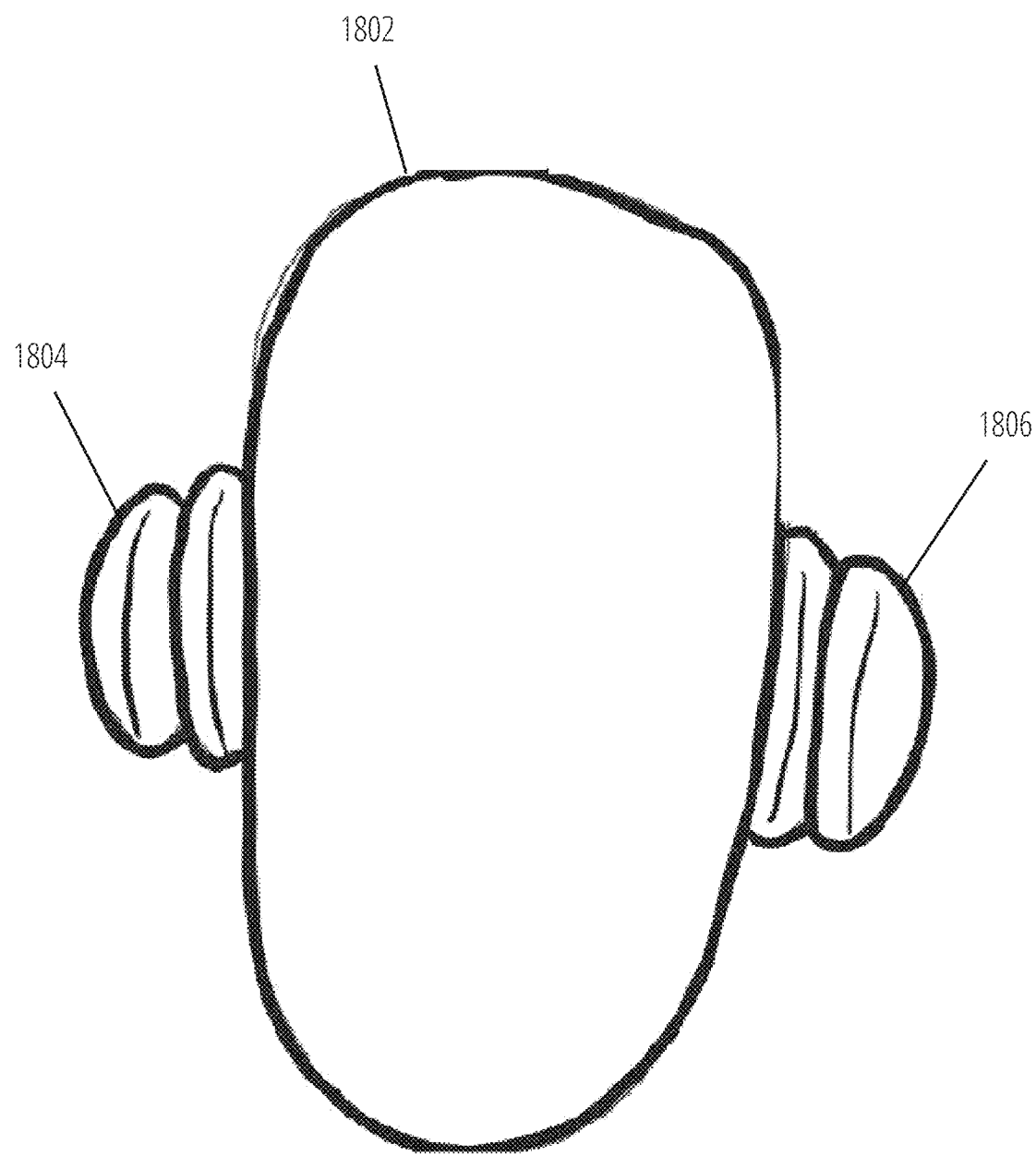
FIG. 18 illustrates a user operating two suction cup headphone apparatuses in accordance with one embodiment.

FIG. 18 illustrates a user 1802 operating two suction cup headphone apparatuses in accordance with one embodiment. The user's right ear utilizes an initial apparatus 1804, while the user's left ear utilizes a receiving apparatus 1806.

Figure 19:
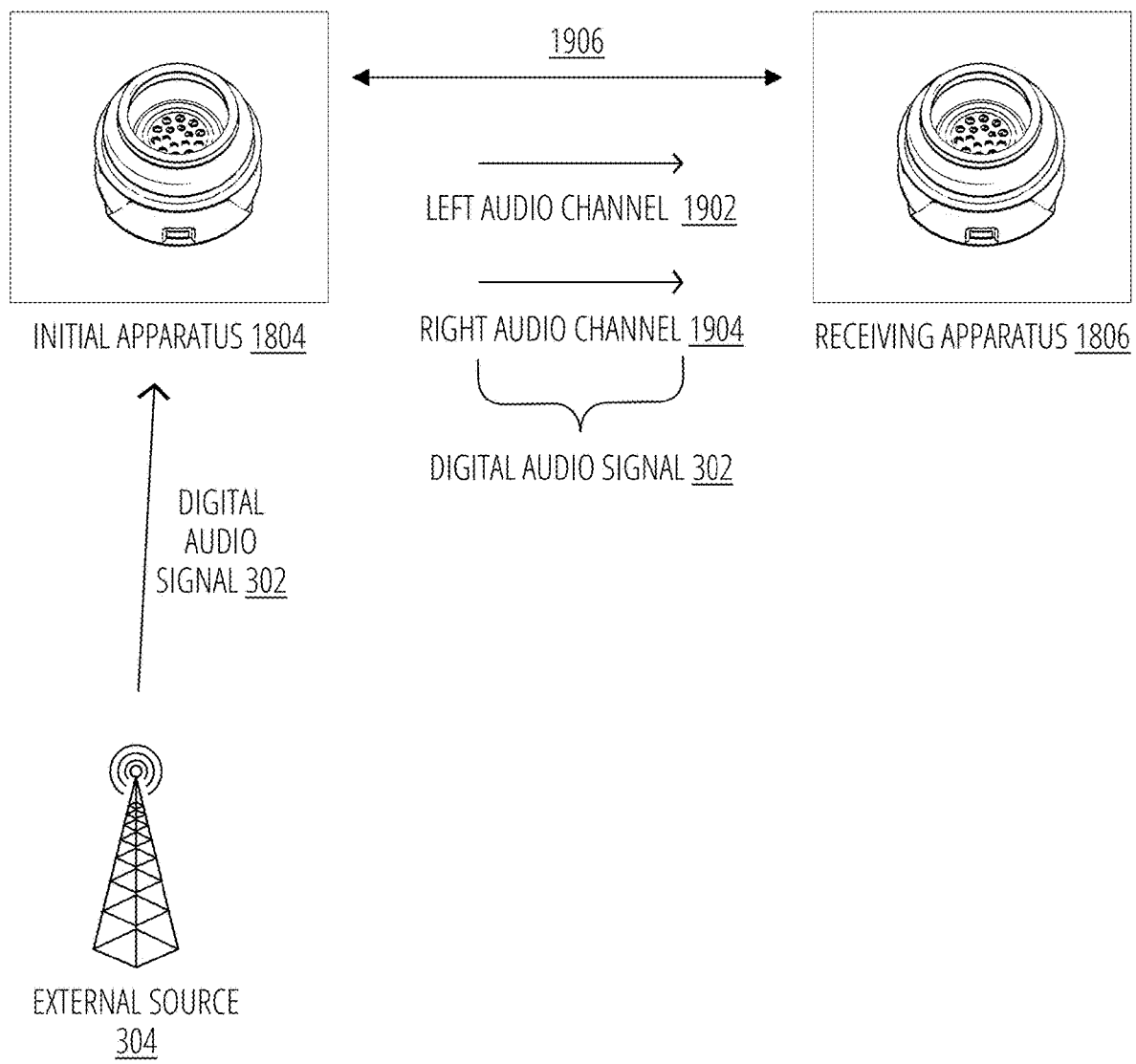
FIG. 19 illustrates a block diagram depicting how a digital audio signal is processed in accordance with one embodiment.

FIG. 19 illustrates a block diagram depicting how a digital audio signal 302 is (1) received by an initial apparatus 1804, (2) bifurcated into a left audio channel 1902 and a right audio channel 1904, and then sent to a receiving apparatus 1806 in accordance with one embodiment. Depicted are an initial apparatus 1804, a receiving apparatus 1806, a left audio channel 1902, a right audio channel 1904, a digital audio signal 302, and an external source 304. An external source 304 transmits a digital audio signal 302 to the initial apparatus 1804. The initial apparatus 1804 relays the digital audio signal 302, bifurcating the same into a left audio channel 1902 and a right audio channels 1904. Thus, the receiving apparatus 1806 receives both channels of the digital audio signal 302, selecting either channel, or as the case may be, combining both channels, for conversion to audible sound. In this embodiment the initial apparatus will convert one channel into audible sound while the receiving apparatus converts the other channel into audible sound. The initial apparatus 1804 and the receiving apparatus 1806 remain in communication with each other, transmitting at least one digital signal 1906 to each other.

It is to be understood that the suction cup headphone apparatus is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

LISTING OF DRAWING ELEMENTS 100 suction cup headphone apparatus
102 suction cup
104 opening for first power cord port
106 proximal end
108 annular suction lip
110 loudspeaker unit
112 housing unit
114 first housing unit
116 second housing unit
118 cavity
202 distal end
302 digital audio signal
304 external source
306 audible sound
402 optional headband jack
404 second power cord port
406 first state
502 second state
702 input button
704 loudspeaker unit base
706 loudspeaker unit cap
708 loudspeaker unit sidewall
710 loudspeaker unit casing
802 suction container
902 power distributor
904 first annular sidewall
906 first flange
908 centering braces
910 first power cord port
1302 second flange
1304 second annular sidewall
1402 air-vent valve
1502 integrated circuit
1504 loudspeaker
1506 battery
1602 optional headband
1604 second power cord
1702 microphone
1704 volume-control mechanism
1706 receiver
1708 transmitter
1710 antenna
1712 set of internal components
1802 user
1804 initial apparatus
1806 receiving apparatus
1902 left audio channel
1904 right audio channel
1906 digital signal

What is claimed is:

1. A suction cup headphone apparatus capable of enclosing an ear of a user by way of suction, said suction cup headphone apparatus capable of delivering audible sound to the user, comprising:
a suction cup comprising a suction container, the suction container having an elastic characteristic, the suction container configured to surround a cavity, the suction container comprising a proximal end and a distal end, the distal end having a first state, the distal end capable of being depressed, the distal end configured to adopt a second state when the distal end is depressed, the distal end configured to expel air from the cavity when the distal end adopts the second state, the distal end capable of reverting to the first state, the distal end capable of causing air pressure inside the cavity to fall when the distal end reverts to the first state, the proximal end comprising an annular suction lip, the annular suction lip configured to encircle an ear of the user, the annular suction lip configured to contact a head of the user when the annular suction lip encircles the ear, the suction container configured to enclose the ear when the annular suction lip contacts the head, said suction cup configured to create a suction seal around the ear when the distal end reverts to the first state while the suction container encloses the ear, the suction seal capable of keeping said suction cup in place over the ear until said suction cup is removed;
a loudspeaker unit, said loudspeaker unit placed inside the cavity, said loudspeaker unit connected to the suction container, said loudspeaker unit comprising a loudspeaker unit casing and a set of internal components, the set of internal components placed inside the loudspeaker unit casing, the set of internal components comprising a loudspeaker, an integrated circuit, and a battery, the battery connected to the loudspeaker, the battery connected to the integrated circuit, the battery configured to provide electrical power to the loudspeaker, the battery configured to provide electrical power to the integrated circuit, the integrated circuit comprising a receiver, the receiver configured to receive at least one external audio signal from at least one external source, the integrated circuit connected to the loudspeaker, the integrated circuit configured to amplify the at least one external audio signal, the integrated circuit configured to deliver the at least one external audio signal to the loudspeaker, the loudspeaker configured to convert the at least one external audio signal into the audible sound, the loudspeaker configured to direct the audible sound toward the ear; and
a housing unit configured to receive said suction cup, said housing unit configured to receive said loudspeaker unit, said housing unit comprising a first housing unit, the first housing unit comprising a first annular sidewall, a first flange extending radially inwardly from the first annular sidewall, and a plurality of centering braces that extend radially inwardly from the first annular sidewall and perpendicularly from the first flange, the plurality of centering braces configured to apply direct pressure to the suction container, the plurality of centering braces configured to apply indirect pressure to said loudspeaker unit, the distal end of said suction cup configured to protrude through the first flange.

2. The suction cup headphone apparatus of claim 1, wherein the loudspeaker unit casing comprises a loudspeaker unit cap, at least one loudspeaker unit sidewall, and a loudspeaker unit base, the loudspeaker unit base connected perpendicularly to the at least one loudspeaker unit sidewall, the loudspeaker unit cap connected perpendicularly to the at least one loudspeaker unit sidewall, the loudspeaker unit cap being opposed to the loudspeaker unit base, the loudspeaker unit cap being parallel to the loudspeaker unit base, the set of internal components placed within the loudspeaker unit casing, the loudspeaker unit base being rigid, the loudspeaker unit base being porous, the loudspeaker unit sidewall being rigid, the loudspeaker unit sidewall being porous, the loudspeaker unit casing capable of allowing the air to move throughout the cavity.

3. The suction cup headphone apparatus of claim 2, wherein the loudspeaker unit base is further comprised of an input button, the input button is configured to communicate with the integrated circuit, the input button capable of delivering an activation signal to the integrated circuit, the activation signal configured to cause the integrated circuit to activate the set of internal components, the input button capable of delivering a deactivation signal to the integrated circuit, the deactivation signal configured to cause the integrated circuit to deactivate the set of internal components.

4. The suction cup headphone apparatus of claim 3, wherein the set of internal components further comprises a volume-control mechanism, the volume-control mechanism configured to communicate with the integrated circuit, the integrated circuit configured to receive at least one digital signal from the input button, the volume-control mechanism configured to communicate with the loudspeaker, the audible sound having a volume, the loudspeaker capable of adjusting the volume, the integrated circuit configured to determine whether the at least one digital signal includes at least one command to adjust the volume, the integrated circuit configured to deliver the at least one command to adjust the volume to the volume-control mechanism, the volume-control mechanism capable of interpreting the at least one command to adjust the volume, the volume-control mechanism capable causing the loudspeaker to adjust the volume in accordance with the at least one command to adjust the volume.

5. The suction cup headphone apparatus of claim 4, wherein the integrated circuit is configured to receive the at least one digital signal from the at least one external source.

6. The suction cup headphone apparatus of claim 5, wherein the set of internal components further comprises a microphone, the microphone capable of converting ambient audible sound into at least one internal audio signal, the microphone configured to communicate with the integrated circuit, the microphone configured to deliver the at least one internal audio signal to the integrated circuit, the integrated circuit further comprising a transmitter, the transmitter configured to deliver the at least one internal audio signal to at least one external destination.

7. A system, comprising:
a plurality of suction cup headphone apparatuses as recited in claim 6, said plurality of suction cup headphone apparatuses configured to communicate with each other to synchronize delivery of the audible sound, said plurality of suction cup headphone apparatuses comprising an initial apparatus and at least one receiving apparatus, the initial apparatus configured to receive the at least one digital signal, the initial apparatus configured to deliver the at least one digital signal to the at least one receiving apparatus, the initial apparatus configured to receive at least one digital audio signal, the initial apparatus configured to bifurcate said at least one digital audio signal into a left audio channel and a right audio channel, the initial apparatus configured to deliver the left audio channel to the at least one receiving apparatus, the initial apparatus configured to deliver the right audio channel to the at least one receiving apparatus, the at least one receiving apparatus capable of converting the left audio channel or the right audio channel into audible sound.

8. The suction cup headphone apparatus of claim 2, wherein the housing unit further comprises:
a first power cord port, the first power cord port mounted to the first annular sidewall, the first power cord port configured to receive electrical power from an external source; and
a power distributor, said power distributor connected to said first power cord port, said power distributor connected to the battery, said power distributor configured to recharge the battery by delivering electrical power from the first power cord port to the battery.

9. The suction cup headphone apparatus of claim 8, wherein the first power cord port is configured to receive power from an external power supply via a first power cord, the first power cord configured to connect to the external power supply, the first power cord configured to pass from the external power supply through the housing unit to the first power cord port, the first power cord being configured to connect to the first power cord port.

10. The suction cup headphone apparatus of claim 8, wherein the battery is configured to deliver power to an external destination via a second power cord, the second power cord configured to pass from the battery through the suction container, the second power cord configured to pass from the suction container through the loudspeaker unit sidewall, the second power cord configured to pass from the loudspeaker unit sidewall through the housing unit, the second power cord configured to pass from the housing unit to the external destination, the second power cord configured to connect to the external destination.

11. The suction cup headphone apparatus of claim 8, wherein the power distributor is configured to deliver power to an external destination via a second power cord, the second power cord configured to pass from the power distributor through the housing unit, the second power cord configured to pass from the housing unit to the external destination, the second power cord configured to connect to the external destination.

12. The suction cup headphone apparatus of claim 1, wherein the suction container has a bellows shape.

13. The suction cup headphone apparatus of claim 1, wherein the suction container has a conical shape.

14. The suction cup headphone apparatus of claim 1, wherein the distal end is capable of compressing the air into the cavity when the distal end adopts the second state, the annular suction lip having a default state, the annular suction lip capable of expanding when the suction container encloses the ear and when the distal end compresses the air into the cavity, the annular suction lip capable of releasing the air when the annular suction lip is expanded, the annular suction lip configured to revert to the default state when the distal end reverts to the first state.

15. The suction cup headphone apparatus of claim 1, wherein the distal end is further comprised of an air-vent valve, the air-vent valve configured to permit the air to flow in one direction, the air-vent valve configured to open when the distal end adopts the second state, the air-vent valve configured to release the air from the cavity through the air-vent valve when the air-vent valve is open, the air-vent valve configured to close when the distal end reverts to the first state.

16. The suction cup headphone apparatus of claim 1, wherein the suction cup is further comprised of a noise-cancelling material.

17. The suction cup headphone apparatus of claim 1, wherein the suction cup is further comprised of a water-resistant material.

18. The suction cup headphone apparatus of claim 1, wherein the housing unit is further comprised of a second housing unit, the second housing unit having a second annular sidewall and a second flange extending radially inwardly from the second annular sidewall, the second annular sidewall having a larger diameter than the first annular sidewall, the first housing unit having an exterior side, the second housing unit having an interior side, the interior side of said second housing unit mounted to the exterior side of the first housing unit, the distal end of the suction cup configured to protrude through the first flange, the distal end of the suction cup configured to protrude through the second flange, the first flange connected to the second flange.

* * * * *